(12) United States Patent
Yabuta et al.

(10) Patent No.: US 9,316,858 B2
(45) Date of Patent: Apr. 19, 2016

(54) DISPLAY DEVICE

(75) Inventors: Kohji Yabuta, Osaka (JP); Tomotoshi Tsujioka, Osaka (JP); Kosuke Nagata, Osaka (JP); Mikihiro Noma, Osaka (JP); Masayuki Hata, Osaka (JP); Kiyoshi Inada, Osaka (JP); Hideaki Takizawa, Osaka (JP); Masahiro Kihara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 213 days.

(21) Appl. No.: 14/113,062

(22) PCT Filed: Apr. 13, 2012

(86) PCT No.: PCT/JP2012/060113
§ 371 (c)(1),
(2), (4) Date: Oct. 21, 2013

(87) PCT Pub. No.: WO2012/144434
PCT Pub. Date: Oct. 26, 2012

(65) Prior Publication Data
US 2014/0043569 A1  Feb. 13, 2014

(30) Foreign Application Priority Data
Apr. 22, 2011  (JP) .................................. 2011-096230

(51) Int. Cl.
*G02F 1/1335* (2006.01)
*G02F 1/1333* (2006.01)
(Continued)

(52) U.S. Cl.
CPC ........ *G02F 1/133509* (2013.01); *G02F 1/1347* (2013.01); *G02F 1/13338* (2013.01);
(Continued)

(58) Field of Classification Search
CPC .......... G02F 1/13338; G02F 1/133509; G02F 1/1347; G02F 1/1345; G02F 2202/28; G02F 2001/133354; G02F 2001/133388; G02F 2201/44; G02F 1/133512; G06F 3/041; G02B 5/008; G02B 27/2214; H04N 13/0409
USPC ........................................................... 349/12
See application file for complete search history.

(56) References Cited

U.S. PATENT DOCUMENTS 6,814,452 B2 * 11/2004 Kusuda .......................... 359/613
2009/0086150 A1   4/2009 Koyama et al.
(Continued)

FOREIGN PATENT DOCUMENTS

JP       2008-9189 A    1/2008
JP       4588761 B2    12/2010
JP       2011-74162 A   4/2011

OTHER PUBLICATIONS

Official Communication issued in International Patent Application No. PCT/JP2012/060113, mailed on Jun. 26, 2012.

*Primary Examiner* — Hoan C Nguyen
(74) *Attorney, Agent, or Firm* — Keating & Bennett, LLP

(57) ABSTRACT

A liquid crystal display device includes a liquid crystal display panel, a functional panel, a photo curable adhesive, a transparent electrode, and a light blocking line. The liquid crystal panel includes a display area to display an image and a non-display area surrounding the display area. The functional panel is attached to the liquid crystal panel, and includes a display overlapping area overlapping with the display area and a display non-overlapping area overlapping with the non-display area in a plan view. The photo curable adhesive is arranged between the panels and cured by light applied thereto. The transparent electrode is arranged in the display overlapping area and made of light transmissive conductive material. The light blocking line is arranged in the display non-overlapping area and made of light shielding metal material. The light blocking line partially has a light-transmission cutout that is configured to allow the light to pass therethrough.

17 Claims, 31 Drawing Sheets

(51) Int. Cl.
*G06F 3/041* (2006.01)
*G02F 1/1347* (2006.01)
*G02F 1/1345* (2006.01)
*H04N 13/04* (2006.01)
*G02B 5/00* (2006.01)
*G02B 27/22* (2006.01)

(52) U.S. Cl.
CPC ............... *G06F3/041* (2013.01); *G02B 5/008* (2013.01); *G02B 27/2214* (2013.01); *G02F 1/1345* (2013.01); *G02F 1/133512* (2013.01); *G02F 2001/133354* (2013.01); *G02F 2001/133388* (2013.01); *G02F 2201/44* (2013.01); *G02F 2202/28* (2013.01); *H04N 13/0409* (2013.01)

(56) References Cited

U.S. PATENT DOCUMENTS

| | | | |
|---|---|---|---|
| 2010/0053114 A1* | 3/2010 | Kaigawa | 345/174 |
| 2010/0079716 A1* | 4/2010 | Nakagawa et al. | 349/149 |
| 2010/0085326 A1* | 4/2010 | Anno | 345/174 |
| 2010/0296027 A1* | 11/2010 | Matsuhira | G02F 1/133308 349/96 |
| 2010/0321621 A1* | 12/2010 | Kikuchi et al. | 349/122 |
| 2012/0032917 A1* | 2/2012 | Yamaguchi | 345/174 |
| 2012/0327005 A1* | 12/2012 | Hamada et al. | 345/173 |
| 2014/0055383 A1* | 2/2014 | Kim et al. | 345/173 |

* cited by examiner

DISPLAY DEVICE

TECHNICAL FIELD

The present invention relates to a display device.

BACKGROUND ART

An electronic device such as a mobile terminal device, a computer, and a television device includes a display device having a display panel such as a liquid crystal panel. Examples of the mobile terminal device include a mobile phone, a smart phone, and PDA. In such a device, a "parallax barrier system" may be employed to display a stereoscopic image. The parallax barrier system utilizes the characteristics of human eye to perceive the stereoscopic image based on a binocular parallax, which is difference in a perception of an object by left and right eyes. For example, Patent Document 1 below discloses a display device including a function to display the stereoscopic image. In such a display device, a parallax barrier panel including a barrier light blocking layer is attached to the liquid crystal panel configured to display an image with an adhesive.

RELATED ART DOCUMENT

Patent Document

Patent Document 1: Japanese Patent No. 4588761

Problem to be Solved by the Invention

In the display device described in the above-described Patent Document 1, the barrier light blocking layer of the parallax barrier panel is provided at a fixed position and is configured to always display a stereoscopic image. In some cases, a switching liquid crystal panel that includes two substrates and liquid crystals sealed between the substrates is used as the parallax barrier panel to switch between a flat image display and a stereoscopic image. Such a switching liquid crystal panel may include a light blocking line made of, for example, light shielding metal material and arranged in a frame section thereof. The frame section is an area overlaps with a non-display area of a liquid crystal display panel in a plan view. The switching liquid crystal panel and the liquid crystal display panel may be bonded together with a photo curable adhesive that is to be cured by light having a specific wavelength range, such as ultraviolet light. However, since the light blocking line does not allow the light to pass through, some parts of the photo curable adhesive may not be cured sufficiently. The insufficiently cured adhesive may not provide sufficient holding power and may cause detachment between the switching liquid crystal panel and the liquid crystal display panel. Even if such detachment does not occur, the photo curable adhesive may have a semi-cured portion or an uncured portion that may cause partial detachment between the liquid crystal panel and the switching liquid crystal panel. The light may be irregular reflected at the interface of the partially detached portion, and thus the display quality may be degraded. In addition, the photo curable adhesive that has a semi-cured portion or an uncured portion may cause uneven thickness of the adhesive, and thus the display quality may be degraded. If the photo curable adhesive has the uncured portion at an outer peripheral portion of the liquid crystal panel and the switching liquid crystal panel, the photo curable adhesive in liquid state may flow to the outside therefrom.

DISCLOSURE OF THE PRESENT INVENTION

The present invention was made in view of the above circumstances. An object of the present invention is to properly cure photo curable adhesive.

Means for Solving the Problem

A display device according to the present invention includes a display panel, a functional panel, a photo curable adhesive, a transparent electrode, and a light blocking line. The display panel includes a display area in which an image is displayed and a non-display area surrounding the display area. The functional panel is attached to the display panel. The functional panel includes a display overlapping area overlapping with the display area in a plan view and a display non-overlapping area overlapping with the non-display area in a plan view. The photo curable adhesive is between the display panel and the functional panel and cured by light applied thereto. The transparent electrode is arranged in the display overlapping area of the functional panel and made of light transmissive conductive material. The light blocking line is arranged in the display non-overlapping area of the functional panel and made of light shielding metal material. The light blocking line partially has a light transmission cutout that is configured to allow the light to pass therethrough.

In this configuration, the display panel and the functional panel are bonded together by applying light to cure the photo curable adhesive that is arranged between the panels. The functional panel includes the display overlapping area that overlaps with the display area of the display panel in a plan view and the display non-overlapping area that overlaps with the non-display area of the display panel in a plan view. In the display overlapping area, the transparent electrodes that are made of the light transmissive conductive material are arranged. In the display non-overlapping area, the light blocking line that is made of light shielding metal material is arranged. In this configuration, a sufficient amount of the light for curing the photo curable adhesive is applied to the photo curable adhesive in the display overlapping area of the functional panel. On the other hand, since the light blocking line blocks the light, an insufficient amount of light may be applied to the photo curable adhesive in the display non-overlapping area.

In the present embodiment, the light blocking line partially includes the light transmission cutout that allows the light to pass therethrough. Thus, the amount of light to be applied to the photo curable adhesive increases by the areas corresponding to the light transmission cutouts. Accordingly, the photo curable adhesive is sufficiently cured in the display non-overlapping area of the functional panel, and thus advantages are obtained. For example, the attachment of the display and the functional panel is maintained with the sufficient holding power.

The following configuration may be preferable as embodiments of the present invention.

(1) The light blocking line may include a potential supply line connected to the transparent electrode to supply a potential to the transparent electrode. The potential supply line included in the light blocking line is made of light shielding metal material that has a low line resistance and high uniformity compared to the light transmissive conductive material that is the material of the transparent electrode. Accordingly, potential is stably supplied to the transparent electrode by the potential supply line compared to a potential supply line that is made of light transmissive conductive material.

(2) The at least one of the transparent electrode in the display overlapping area and the potential supply line in the display non-overlapping area may include an extension connector. The extension connector may extend toward at least one of the display overlapping area and the display non-overlapping area and may be connected to the other one of the transparent electrode and the potential supply line. With this configuration, the extension connector extends toward one of the transparent electrode and the potential supply line to be connected to the one, and thus the transparent electrode in the display overlapping area and the potential supply line in the display non-overlapping area can be connected.

(3) The transparent electrode may include the extension connector. The extension connector may extend to the display non-overlapping area and connected to the potential supply line. With this configuration, the quality of the image displayed in the display area is enhanced compared to a case in which the potential supply line includes the extension connector, which results in a light blocking member in the display overlapping area of the functional panel.

(4) The display device may further include a flexible substrate connected to the functional panel and configured to be connected to an external circuit. The potential supply line may include a terminal connected to the flexible substrate. The terminal may be provided at an end of the potential supply line remote from an end thereof to which the transparent electrode is connected. With this configuration, the potential supplied from the external circuit can be applied to the transparent electrode through the flexible substrate and the potential supply line.

(5) The light blocking line may further include a ground line that is grounded. The ground line may extend in a loop-like shape that surrounds the display overlapping area and the potential supply line. With this configuration, the grounded ground line surrounds the potential supply line in addition to the display overlapping area, and thus the transparent electrode in the display overlapping area and the potential supply line that is configured to supply potential to the transparent electrode can be shielded. Accordingly, the potential can be stably supplied to the transparent electrode.

(6) The light blocking line may include a first light blocking line arranged on a surface of the functional panel and a second light blocking line arranged on a surface different from the surface on which the first light blocking line is arranged. At least a part of the first light blocking line and at least a part of the second light blocking line may overlap with each other in a plan view. The light transmission cutout may include a first light transmission cutout in the first light blocking line and a second light transmission cutout in the second light blocking line. The first light transmission cutout and the second light transmission cutout may overlap with each other in a plan view. In this configuration, at least a part of the first light blocking line and at least a part of the second light blocking line overlap with each other. Compared to a case in which the first and the second light blocking lines do not overlap, the region that blocks light decreases by an area corresponding to the overlapped portion. Thus, the amount of light to be applied to the photo curable adhesive increases. Consequently, the light can be sufficiently applied to the photo curable adhesive through the light transmission cutouts that overlap each other in a plan view.

(7) The functional panel is a parallax barrier panel that can separate the image displayed on the display panel by parallax. With this configuration, the image displayed on the display panel is separated by the parallax barrier panel, and thus the user of the display device can recognize the stereoscopic image.

(8) The parallax barrier panel may include two substrates arranged facing each other and liquid crystals sealed between the substrates. The transparent electrode may include a plurality of transparent electrodes. Each of the transparent electrodes may be arranged on a plate surface of each of the substrates so as to face each other with the liquid crystals therebetween. The transparent electrodes may be configured to provide a plurality of barrier sections and a barrier opening provided between the barrier sections by a controlled voltage between the transparent electrodes. The barrier sections may be configured to block light and the barrier opening is configured to allow light to pass therethrough. In this configuration in which the barrier sections and the barrier opening are provided, the image displayed on the display panel is seen at a specific viewing angle through the barrier opening that is arranged between the barrier sections. This enables the image displayed on the display panel to be separated by parallax. In addition, the voltages between the corresponding transparent electrodes are controlled to selectively form the barrier sections and the barrier opening of the parallax barrier panel. This enables the switching between the stereoscopic image display and the flat image display.

(9) One of the transparent electrodes may be arranged on another plate surface of one of the substrates. The other plate surface faces a side opposite to the liquid crystals. The transparent electrode arranged on the other plate surface may provide a touch panel pattern that is configured to detect a position input by a user of the display device. With this configuration, the parallax barrier panel can have the touch panel function.

(10) The functional panel may be a touch panel in which the transparent electrode configures a touch panel pattern that is configured to detect a position input by a user of the display device. With this configuration, the position touched by the user can be detected by the touch panel pattern constituted by the transparent electrode.

(11) The light transmission cutout may further include a plurality of light transmission cutouts. The transmission cutouts may be arranged in a longitudinal direction and a width direction of the light blocking line. With this configuration, the light blocking line has a net-like shape in a plan view, and thus, breaking of the light blocking line is less likely to occur.

(12) The plurality of light transmission cutouts each may have an equal size and may be arranged at a constant arrangement pitch. With this configuration, light can be further evenly applied to the photo curable adhesive through the light transmission cutouts.

(13) The plurality of light transmission cutouts may extend along a the longitudinal direction of the light blocking line. With this configuration, each light blocking line has a stripe-like shape in a plan view, and thus the light transmission cutouts can have larger areas compared to the light transmission cutout in the light blocking lines that has a net-like shape. Accordingly, the amount of light to be applied to the photo curable adhesive increases.

(14) The display panel is a liquid crystal panel that includes two substrates and liquid crystals sealed between the substrates. The display device includes a lighting device configured to apply light to the liquid crystal panel. With this configuration, an image can be displayed on the liquid crystal panel by the light applied by the lighting device. The display device can be used as a liquid crystal display device in various electronic devices such as a handheld terminal, a mobile phone, a laptop computer, and a handheld gaming device.

Advantageous Effect of the Invention

According to the present invention, the photo curable adhesive can be properly cured.

MODE FOR CARRYING OUT THE INVENTION

First Embodiment

A first embodiment of the present invention will be described with reference to FIG. 1 to FIG. 23. In the first embodiment, a liquid crystal display device (display device) 10 will be described as an example. An X-axis, a Y-axis, and a Z-axis are described in some of the drawings, and a direction of each axis corresponds to the direction described in each drawing. An upper and lower direction is described based on FIG. 1. In addition, the upper side in FIG. 1 corresponds to a front side, and the lower side therein corresponds to a rear side.

Figure 1:
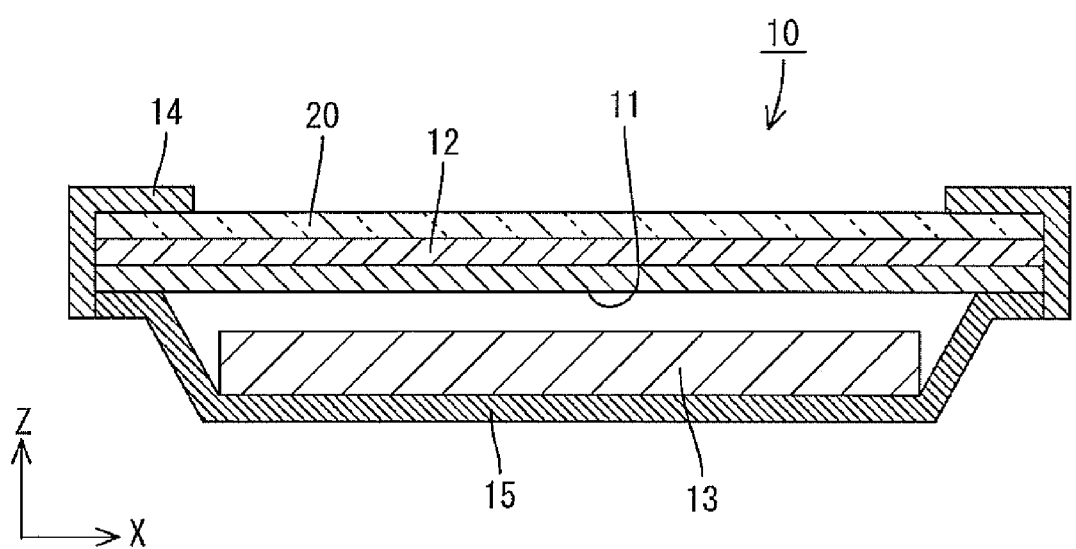
FIG. 1 is a cross-sectional view illustrating a general configuration of a liquid crystal display device according to a first embodiment of the present invention.
Figure 2:
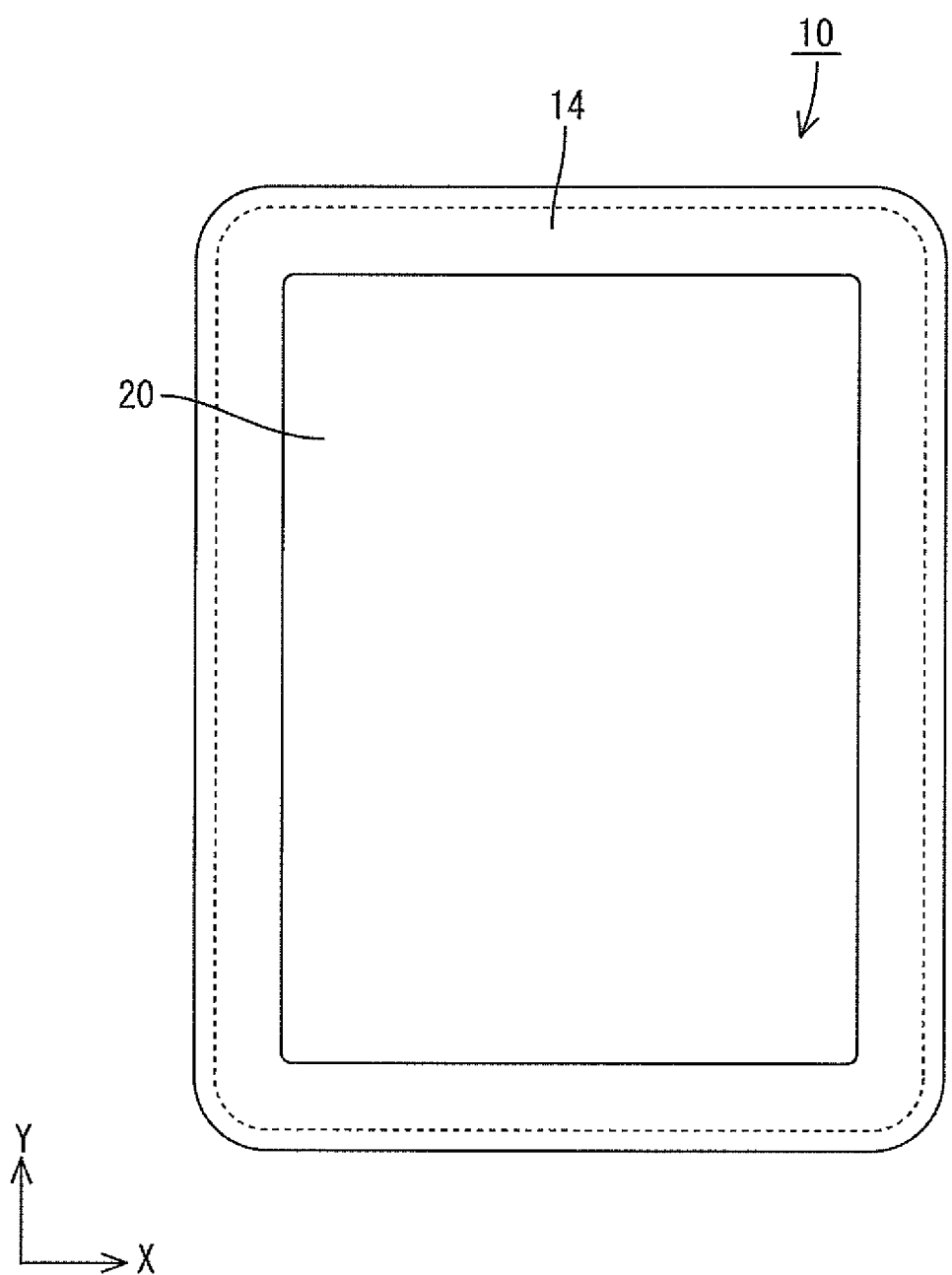
FIG. 2 is a plan view of the liquid crystal display device.

A configuration of the liquid crystal display device 10 is described. As illustrated in FIG. 1 and FIG. 2, the liquid crystal display device 10 has a rectangular shape as a whole in a plan view. The liquid crystal display device 10 may be placed in a portrait orientation (in a vertical position) or a landscape orientation (in a horizontal position). The liquid crystal display device 10 includes a liquid crystal panel 11 (a display panel), a functional panel 12 having a parallax barrier function and a touch panel function (a position input function), and a backlight unit 13 (a lighting device) as an external lighting source configured to emit light toward the liquid crystal panel 11 and the functional panel 12. The liquid crystal display device 10 further includes a cover panel 20 configured to protect the functional panel 12, a bezel 14 holding the cover panel 20, the liquid crystal panel 11, and the functional panel 12, and a housing 15 housing the backlight unit 12 and to which the bezel 14 is attached.

Figure 3:
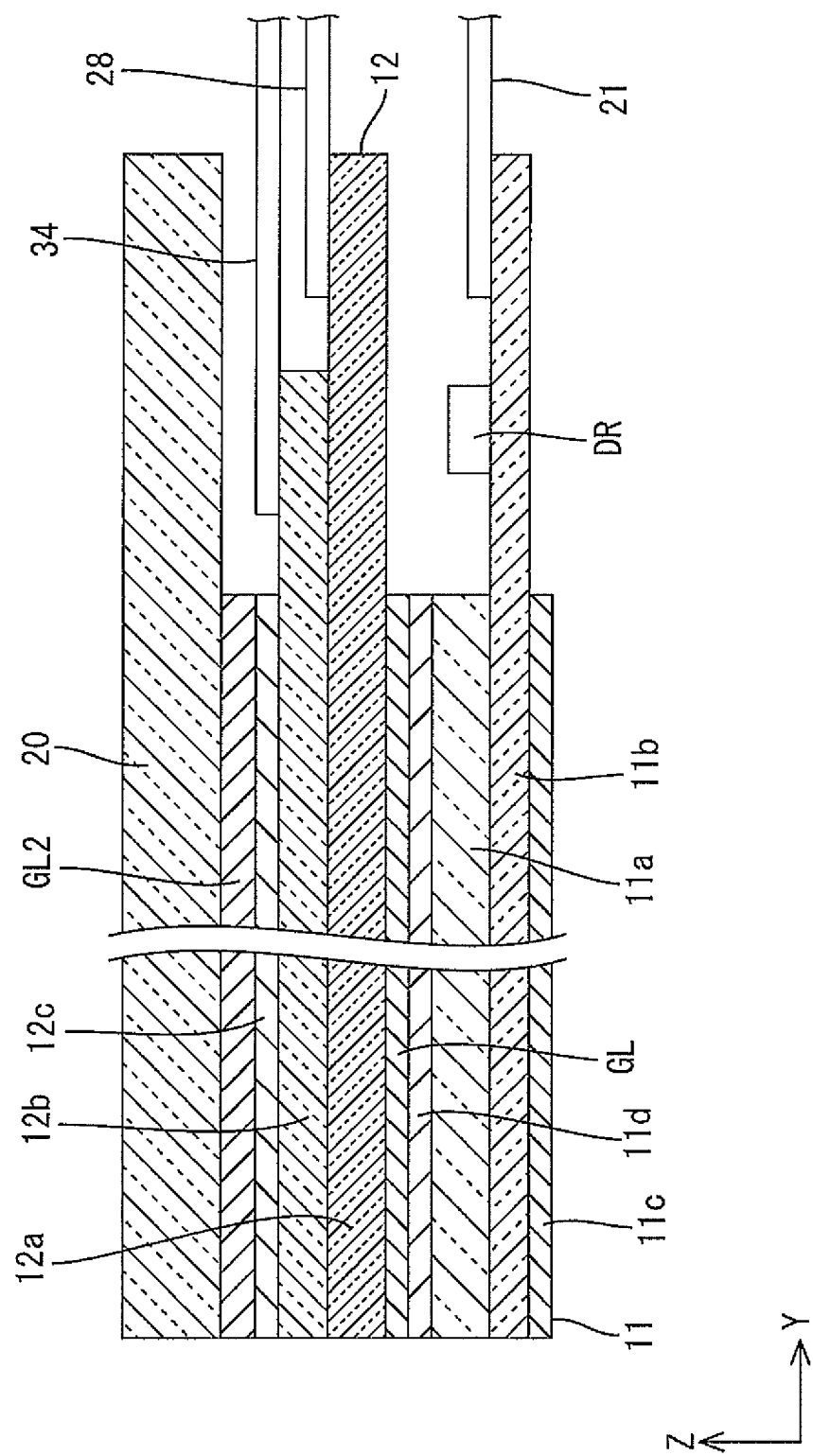
FIG. 3 is a cross-sectional view of a liquid crystal panel, a functional panel, and a cover panel.

As illustrated in FIG. 3, the liquid crystal panel 11 and the functional panel 12 are arranged such that main surfaces thereof face each other. The functional panel 12 is arranged on a front side (a light emitting side, a user side), and the liquid crystal panel 11 is arranged on a rear side (a side closer to the backlight unit 13, a side opposite to the light emitting side). The liquid crystal panel 11 and the functional panel 12 are connected to each other with a photo curable adhesive GL therebetween. The photo curable adhesive GL is made of high light transmissive photo curable resin material that is almost transparent. The photo curable resin material of the photo curable adhesive GL is one that can maintain the connection between the liquid crystal panel 11 and the functional panel 12. The photo curable resin material in a liquid state is applied to at least one of the liquid crystal panel 11 and the functional panel 12 and cured by light having a specific wavelength range while the liquid crystal panel 11 and the functional panel 12 are attached to each other. Specifically, the photo curable resin material of the photo curable adhesive GL is cured by ultra violet rays (UV rays) and is a cation polymerization type photo curable resin material that includes epoxy or vinyl ether as a main component. Further, the cover panel 20 that is made of glass and substantially transparent is bonded to a front surface of the functional panel 12 with an adhesive GL 2. The liquid crystal display device 10 of the present embodiment is used in various electronic devices (not illustrated) such as a handheld terminal (including an e-book and PDA), a mobile phone (including a smart phone), a laptop computer, a digital photo frame, and a handheld gaming device. Accordingly, the liquid crystal panel 11 included in the liquid crystal display device 10 has a display size within a range of a few inch, for example, 3.4 inches, to about 10 inches. That is, the liquid crystal panel 11 has a compact size or a small-medium size.

Figure 4:
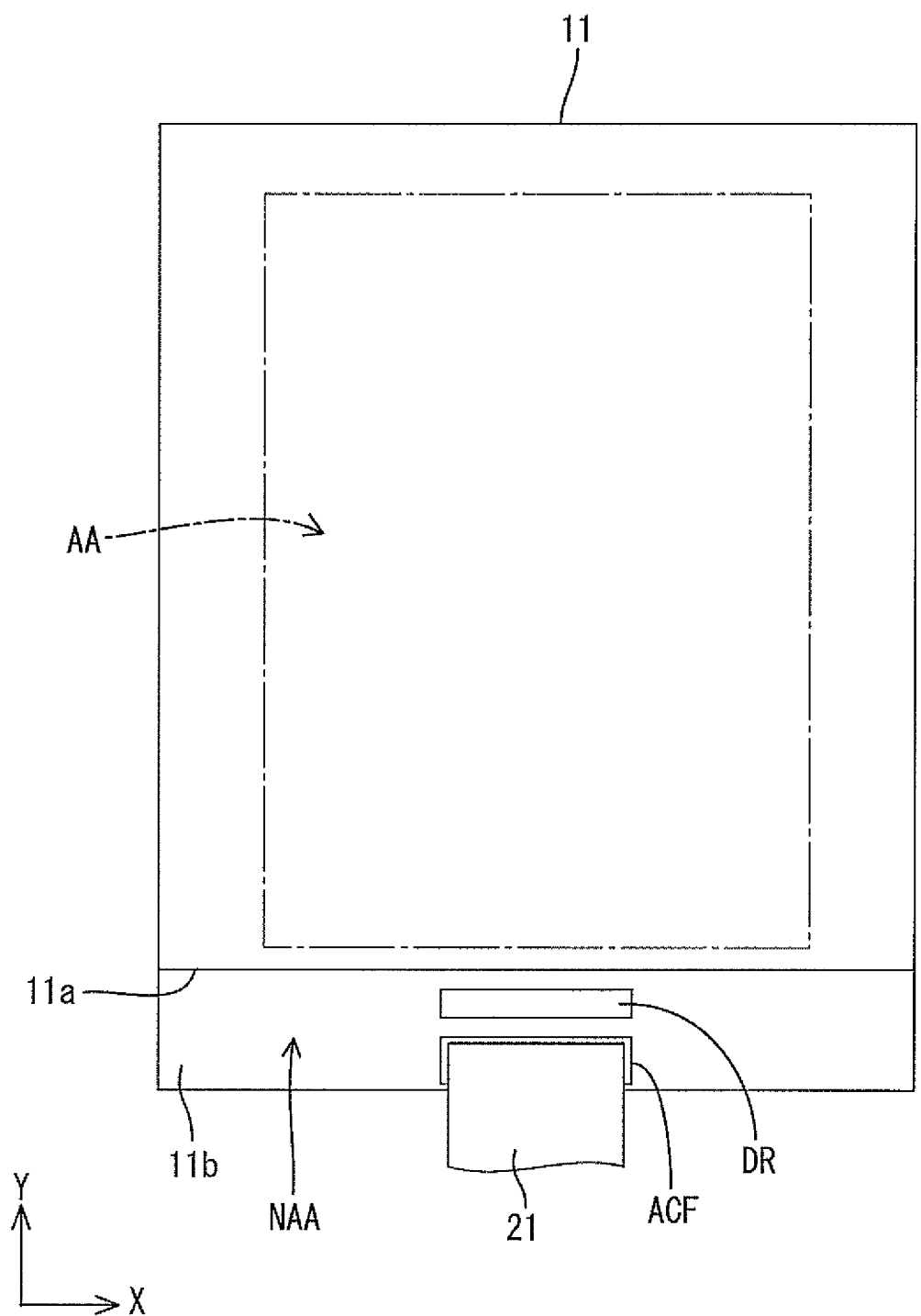
FIG. 4 is a plan view illustrating the liquid crystal panel to which a flexible substrate for panel is connected.

Next, the liquid crystal panel 11 is described. As illustrated in FIG. 3 and FIG. 4, the liquid crystal panel 11 includes a pair of transparent rectangular glass substrates 11a, 11b (capable of light transmission) and a liquid crystal layer (not illustrated) provided therebetween. The liquid crystal layer includes liquid crystals having optical characteristics that vary according to electric fields applied thereto. The substrates 11a, 11b are bonded together with sealant, which is not illustrated, with a space corresponding to the thickness of the liquid crystal layer therebetween. As illustrated in FIG. 4, the liquid crystal panel 11 includes a display area AA (an area enclosed by one dotted chain line) in which an image is displayed and a non-display area NAA in which an image is not displayed. The non-display area NAA has a frame-like shape surrounding the display area AA. Further, as illustrated in FIG. 3, polarizing plates 11c, 11d are each attached to an outer surface side of the substrates 11a, 11b. The above-described photo curable adhesive GL is provided over a substantially entire surface of an outer surface of a front side polarizing plate 11d (on a functional panel 12 side) of the front and rear polarizing plates 11c, 11d. As illustrated in FIG. 2, when the liquid crystal panel 11 is placed in a portrait orientation, a long-side direction (a Y-axis direction) thereof matches a vertical direction of view of a user (the upper and lower direction) and a short-side direction (an X-axis direction) thereof matches a horizontal direction of view of the user (a right-left direction, a direction along eyes LE, RE). When the liquid crystal panel 11 is placed in a landscape orientation, a long-side direction thereof matches the horizontal direction of view of a user and a short-side direction thereof matches the vertical direction of view of the user.

Figure 5:
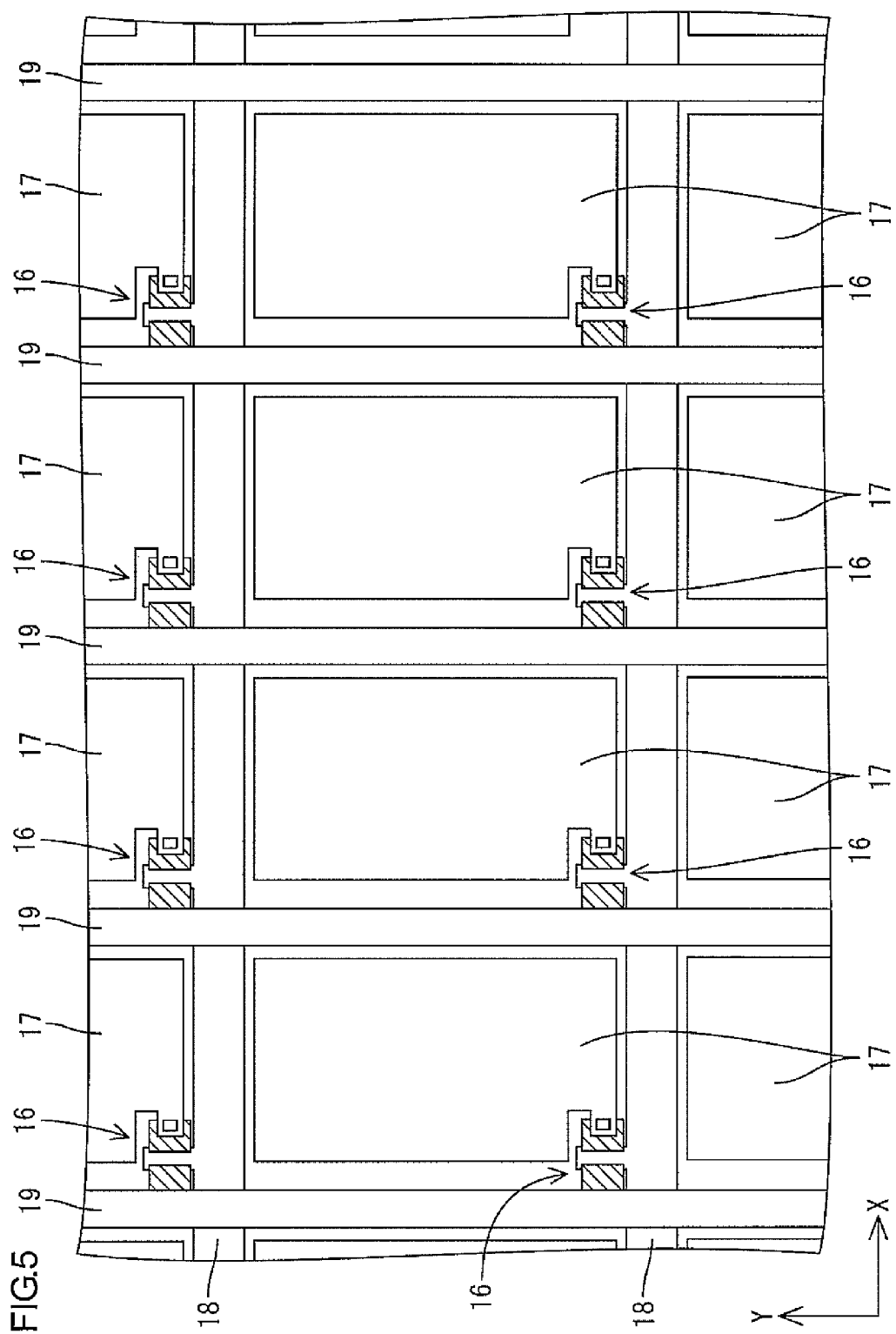
FIG. 5 is a plan view illustrating an arrangement of pixel electrodes and lines on an array substrate included in the liquid crystal panel.

One of the substrates 11a, 11b that is on the front side is a CF substrate 11a and the other one that is on the rear side is an array substrate 11b. As illustrated in FIG. 5, on an inner surface side (a liquid crystal layer side, a side facing the CF substrate 11a) of the array substrate 11b, TFTs 16 (Thin Film Transistor) as switching components and pixel electrodes 17 are arranged in a matrix in a display area AA. Around the TFTs 16 and the pixel electrodes 17, gate lines 18 and source lines 19 are arranged in a grid so as to surround the TFTs 16 and the pixel electrodes 17. The pixel electrodes 17 are made of a substantially transparent and light transmissive conductive material such as ITO (indium tin oxide). The gate lines 18 and the source lines 19 are made of light shielding metal such as copper or titanium. The gate lines 18 and the source lines 19 are connected to gate electrodes and source electrodes of the TFTs 16, respectively, and the pixel electrodes 17 are connected to drain electrodes of the TFTs 16. As illustrated in FIG. 4, the gate lines 18 and the source lines 19 extend to the non-display area NAA of the inner surface of the array substrate 11b, and ends thereof are connected to a driver for driving liquid crystals DR. The driver DR is mounted on an end portion of the array substrate 11b in the long-side direction with a chip on glass method (COG). The driver DR is configured to supply a drive signal to the lines 18, 19 connected to the driver DR. At a position adjacent to the driver DR on the inner surface of the array substrate 11b (in the non-display area NAA), one end of a flexible substrate for panel 21 is connected with pressure via an anisotropic conductive film ACF. The other end of flexible substrate for panel 21 is connected to a control board (not illustrated). This allows the image signal supplied from the control board to be transmitted to the driver DR.

Figure 6:
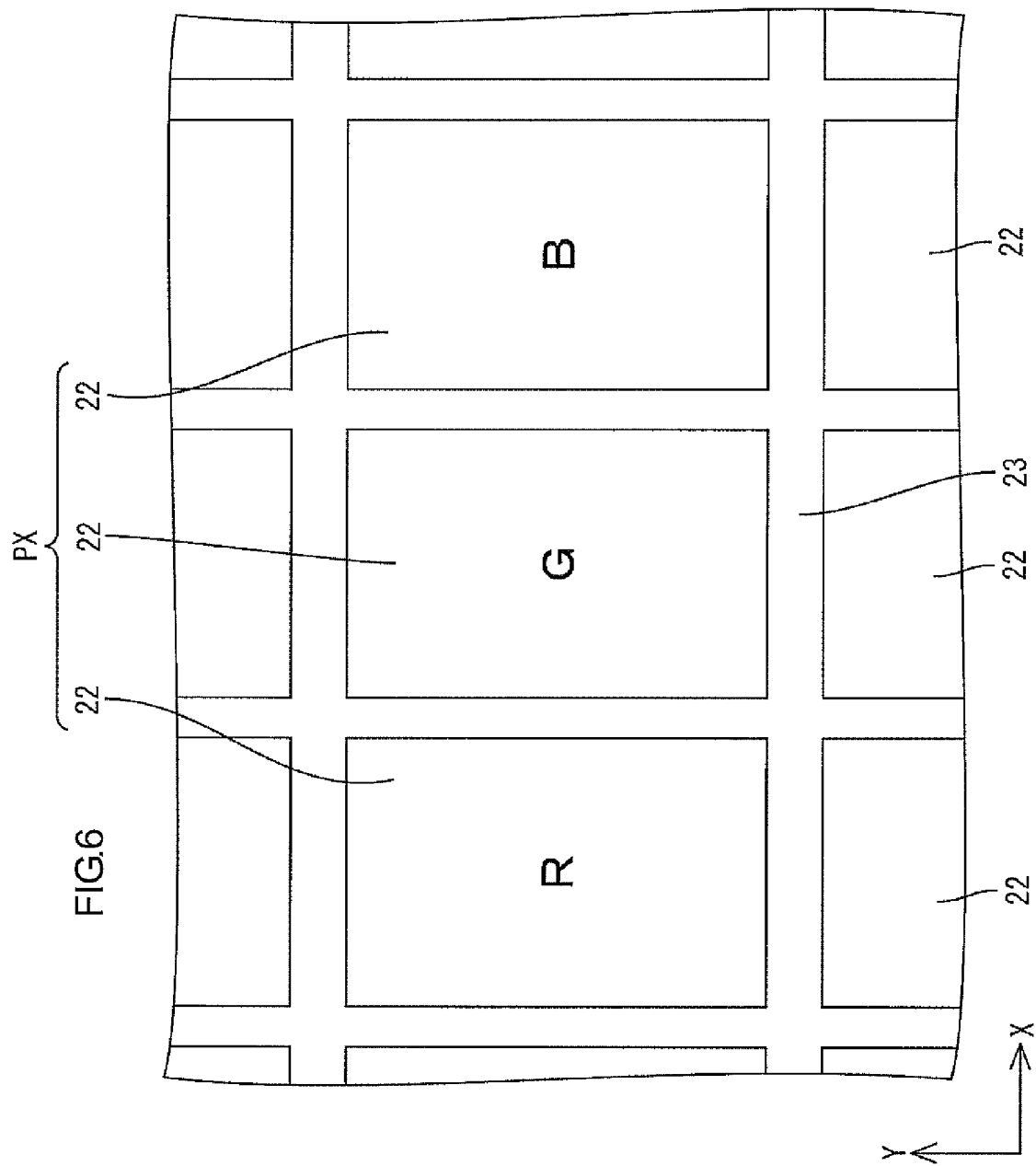
FIG. 6 is a plan view illustrating an arrangement of color sections on a CF substrate included in the liquid crystal panel.

On an inner surface side (a liquid crystal layer side, a surface facing the array substrate 11b side) of the CF substrate 11a, as illustrated in FIG. 6, color filters are arranged at positions overlapping with the pixel electrodes 17 on the array substrate 11b side in a plan view. The color filters include red (R), green (G), and blue (B) color sections 22 that are alternately arranged in the X-axis direction. Each of the color sections 22 has a rectangular shape in a plan view. A long-side direction and a short-side direction of the color section 22 match the long-side direction and the short-side direction of the substrate 11a, 11b, respectively. The color sections 22 are arranged in the X-axis direction and the Y-axis direction in a matrix. Between the color sections 22 included in the color filter, a grid-like light blocking section (a black matrix) 23 that prevents color mixing is provided. The light blocking section 23 is arranged to overlap with the gate lines 18 and the source lines 19 on the array substrate 11b. The color sections 22 of R, G, and B and three pixel electrodes 17 corresponding thereto configure one pixel PX in the liquid crystal panel 11. The pixels PX are arranged in a matrix along a main surface, i.e., the display surface (the X-axis direction and the Y-axis direction) of the substrates 11a, 11b. On front surfaces of the color sections 22 and the light blocking sections 23, counter electrodes (not illustrated) are provided to face the pixel electrodes 17 on the array substrate 11b. As illustrated in FIG. 4, the CF substrate 11a has a long side smaller than that of the array substrate 11b. The CF substrate 11a is attached to the array substrate 11b such that the end in the long-side direction thereof, which is remote from the flexible substrate for panel 21, is flush with the end of the array substrate 11b. The polarizing plate 11d, which is on the front side and attached to the CF substrate 11a, has a size substantially the same as that of the CF substrate 11a in a plan view. An alignment film (not illustrated) is provided on the inner surface side of each of the substrates 11a, 11b to align the liquid crystal molecules in the liquid crystal layer.

The backlight unit 13 is briefly described first, and then the parallax barrier 12 is described. The backlight unit 13 is an edge-light type (a side-light type) backlight unit. The backlight unit 13 includes light sources, a box-like chassis, and a light guiding member, and an optical member. The light sources are arranged to face ends of the light guiding member. The chassis has an opening that opens toward the front side (the liquid crystal panel 11 side, the light exiting side) and houses the light sources. The light guiding member is configured to guide light from the light sources to the opening (light exiting portion) of the chassis. The optical member is arranged to cover the opening of the chassis. The light emitted from the light sources enters the ends of the light guiding member and travels through the light guiding member to exit from the opening of the chassis. Then, the optical member converts the light into a planar light having an even luminance distribution and the light is applied to the liquid crystal panel 11. Light transmissivity of the liquid crystal panel 11 is selectively changed in the display surface by the driving of TFTs 16 included in the liquid crystal panel 11, and thus a predetermined image is displayed in the display surface. The light sources, the chassis, the light guiding member, and the optical member are not illustrated in detail.

Then, the functional panel 12 is described in detail. The functional panel 12 is a multifunctional panel that has "parallax barrier function" and "touch panel function (position input function)". A user can recognize an image displayed in the display surface of the liquid crystal panel 11 as a stereoscopic image (3D image, three-dimensional image) by the parallax barrier function, and a user can input positional information in the display surface of the liquid crystal panel 11 by the touch panel function. The functional panel 12 according to the present embodiment is a "parallax barrier panel" that separates the image to be displayed on the liquid crystal panel 11 by parallax and is a "touch panel (position input panel)" that detects a position input by the user.

Figure 7:
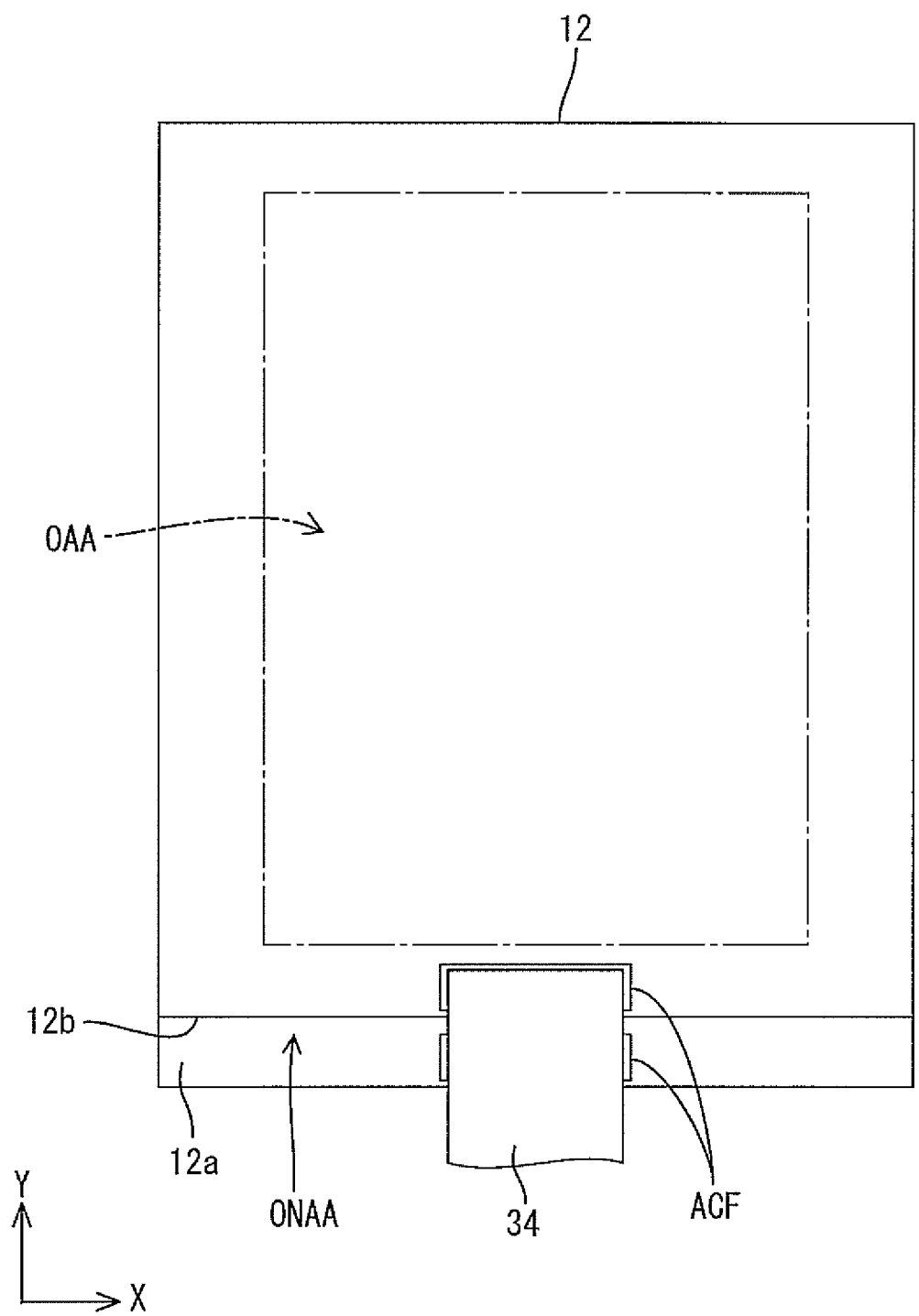
FIG. 7 is a plan view of the functional panel to which the flexible substrates are connected.

As illustrated in FIG. 3 and FIG. 7, the functional panel 12 includes a pair of glass substrates 12a, 12b and a liquid crystal layer (not illustrated) provided therebetween. The glass substrates 12a, 12b each have a rectangular shape in a plan view and are transparent (capable of light transmission). The liquid crystal layer includes liquid crystal molecules having optical characteristics that vary according to electric fields applied thereto. The substrates 12a, 12b are bonded together with sealant, which is not illustrated, with a space corresponding to the thickness of the liquid crystal layer therebetween. The functional panel 12 is a liquid crystal panel. As illustrated in FIG. 7, the functional panel 12 includes a display overlapping area OAA (an area surrounded by a one dotted chain line in FIG. 7) that overlaps with the display area AA of the liquid crystal panel 11 in a plan view and a display non-overlapping area ONAA that overlaps with the non-display area NAA of the liquid crystal panel 11. The display non-overlapping area ONAA has a frame-like shape and surrounds the display overlapping area OAA. The functional panel 12 has a screen size substantially the same as that of the liquid crystal panel 11 and is attached in parallel to the liquid crystal panel 11 with the photo curable adhesive GL. When the functional panel 12 is placed in a portrait orientation, a long-side direction (a Y-axis direction) of the functional panel 12 matches a vertical direction of view of a user (the upper and lower direction) and a short-side direction (an X-axis direction) thereof matches a horizontal direction of view of the user (a right-left direction, a direction along eyes LE, RE). When the functional panel 12 is placed in a landscape orientation, a long-side direction of the functional panel 12 matches the horizontal direction of view of a user and a short-side direction thereof matches the vertical direction of view of the user.

As illustrated in FIG. 7, the substrates 12a, 12b included in the functional panel 12 have short sides (dimension in the X-axis direction) equal to each other. The first substrate 12a, which is on the rear side (the liquid crystal panel 11 side), has long sides (dimension in the Y-axis direction) longer than those of the second substrate 12b, which is on the front side, and substantially equal to the long sides of the array substrate 11b of the liquid crystal panel 11. The second substrate 12b on the front side has long sides longer than those of the CF substrate 11a of the liquid crystal panel 11. As illustrated in FIG. 3, the photo curable adhesive GL that is described above is on an outer surface of the first substrate 12a facing the rear side (a plate surface opposite to the liquid crystal layer side), i.e., a surface opposing to the liquid crystal panel 11. A polarizing plate 12c is attached to an outer surface (a plate surface opposite to the liquid crystal layer side) of the second substrate 12b facing the front side.

The functional panel 12 is configured to provide barrier sections BA, which will be described in detail later, by changing an alignment of the liquid crystal molecules and light transmissivity according to the voltage applied to the liquid crystal layer. The barrier sections BA separate the image on the pixels PX of the liquid crystal panel 11 by parallax, and thus the user can see the stereoscopic image (see FIG. 10). In other words, the functional panel 12 is a switching liquid crystal panel that switches between a flat image (the 2D image, the two-dimensional image) and a stereoscopic image (the 3D image, the three-dimensional image) by active control of the light transmissivity of the liquid crystal layer. Hereinafter, the configuration relating to the "parallax barrier function" of the functional panel 12 will be described in detail.

Figure 8:
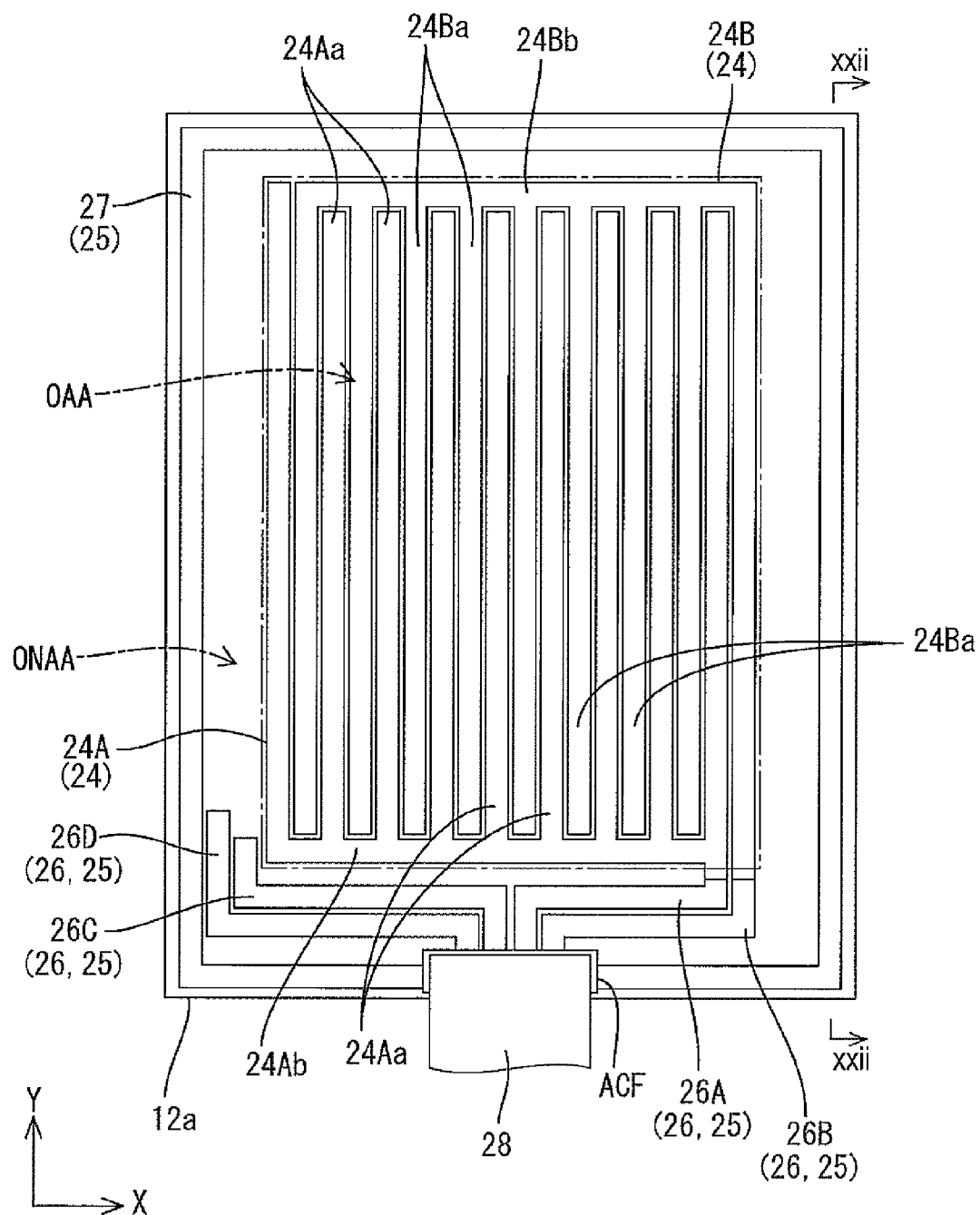
FIG. 8 is a plan view of a first substrate included in the functional panel.
Figure 9:
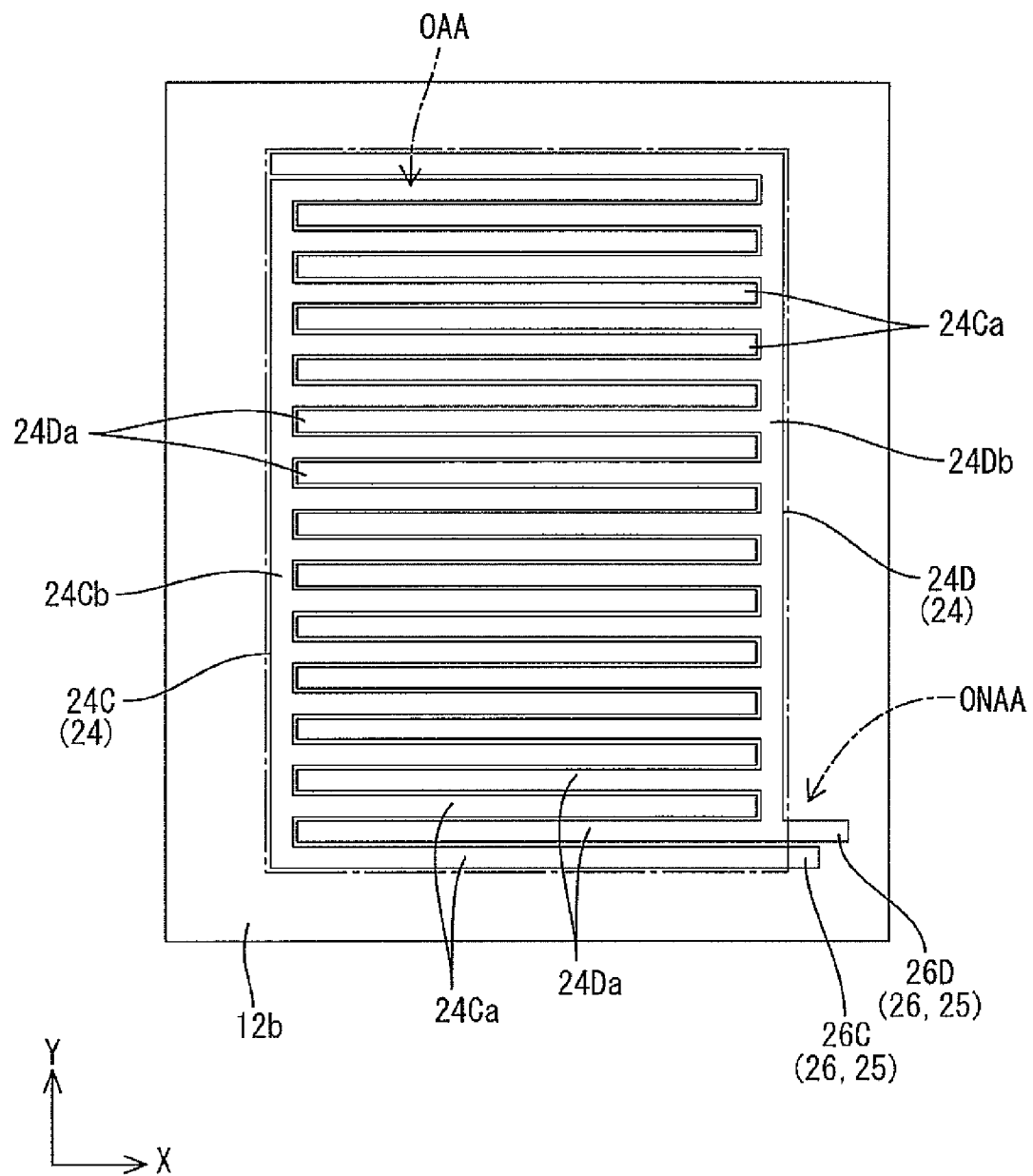
FIG. 9 is a bottom view of a second substrate included in the functional panel.

As illustrated in FIG. 8 and FIG. 9, transparent electrodes for barrier 24 that are configured to supply voltage to the liquid crystal layer are provided on each inner surface (a plate surface on a liquid crystal layer side) of the substrates 12a, 12b included in the functional panel 12 so as to face each other. Like the pixel electrode 17 of the liquid crystal panel 11, the transparent electrode for barrier 24 is made of a light transmissive conductive material that is almost transparent, for example, ITO. Each transparent electrode for barrier 24 is arranged in the display overlapping area OAA of the functional panel 12. With this configuration, the display overlapping area OAA of the functional panel 12 has high light transmissivity, and light passed through the display area AA of the liquid crystal panel 11 can pass therethrough with low loss. The transparent electrodes for barrier 24 are provided in a pair on each of the first substrate 12a, which is on the rear side, and the second substrate 12b, which is on the front side. The transparent electrodes 24 on the first substrate 12a are referred to as a first transparent electrode for barrier 24A and a second transparent electrode for barrier 24B. The transparent electrodes 24 on the second substrate 12b are referred to as a third transparent electrode for barrier 24C and a fourth transparent electrode for barrier 24D.

As illustrated in FIG. 8, the first transparent electrode for barrier 24A has a comb-like shape and the second transparent electrode for barrier 24B has a comb-like shape engaging the first transparent electrode 24A in a plan view. Specifically, the first transparent electrode for barrier 24A includes band-like shape portions 24Aa and a connection portion 24Ab. The second transparent electrode for barrier 24B includes band-like shape portions 24Ba and a connection portion 24Bb. The band-like shape portions 24Aa, 24Ba each have a band-like shape (a strip-like shape) having a constant width and extend in the long-side direction of the first substrate 12a (the Y-axis direction). The band-like shape portions 24Aa, 24Ba are arranged in parallel with each other in the short-side direction of the first substrate 12a (the X-axis direction). The connection portions 24Ab, 24Bb extend in the short-side direction (the X-axis direction) and connect ends of the band-like shape portions 24Aa, 24Ba, respectively. In the display overlapping area OAA of the first substrate 12a, the band-like shape portions 24Aa of the first transparent electrode for barrier 24A and the band-like shape portions 24Ba of the second transparent electrode for barrier 24B are alternately arranged in the short side direction (the X-axis direction).

As illustrated in FIG. 9, the third transparent electrode for barrier 24C has a comb-like shape and the fourth transparent electrode for barrier 24D has a comb-like shape engaging the third transparent electrode for barrier 24C in a plan view. Specifically, the third transparent electrode for barrier 24C includes band-like shape portions 24Ca and a connection portion 24Cb. The fourth transparent electrode for barrier 24D includes band-like shape portions 24Da and a connection portion 24Db. The band-like shape portions 24Ca, 24Da each have a band-like shape (a strip-like shape) having a constant width and extend in the short-side direction of the second substrate 12b (the X-axis direction). The band-like shape portions 24Ca, 24Da are arranged in parallel with each other in the long-side direction of the second substrate 12b (the Y-axis direction). The connection portions 24Cb, 24Db extend in the log-side direction (the Y-axis direction) and connect ends of the band-like shape portions 24Ca, 24Da, respectively. In the display overlapping area OAA of the second substrate 12b, the band-like shape portions 24Ca of the third transparent electrode for barrier 24C and the band-like shape portions 24Da of the fourth transparent electrode for barrier 24D are alternately arranged in the long-side direction (the Y-axis direction). In the substrates 12a, 12b that are attached to each other, the band-like shape portions 24Ab of the first transparent electrode for barrier 24A and the band-like shape portions 24Bb of the second transparent electrode for barrier 24B face the band-like shape portions 24Ca of the third transparent electrode for barrier 24C and the band-like shape portions 24Da of the fourth transparent electrode for barrier 24D with the liquid crystal layer therebetween while the long-side directions thereof are oriented substantially perpendicular to each other.

A normally white type switching liquid crystal panel may be used as the functional panel 12 of the present embodiment. In such a switching liquid crystal panel, when a potential difference between the first transparent electrode for barrier 24A and the second transparent electrode 24B and the third transparent electrode for barrier 24C, and the fourth transparent electrode 24D is 0, the liquid crystal layer has the maximum light transmissivity, so that the maximum amount of the light can be passed through over the entire area of the liquid crystal layer. In addition, in the functional panel 12 according to the present embodiment, the driving thereof is controlled by supplying a predetermined potential to the electrodes 24A to 24D, and a user can view the stereoscopic image when the liquid crystal display device 10 is placed in both of the portrait orientation and the landscape orientation.

Figure 10:
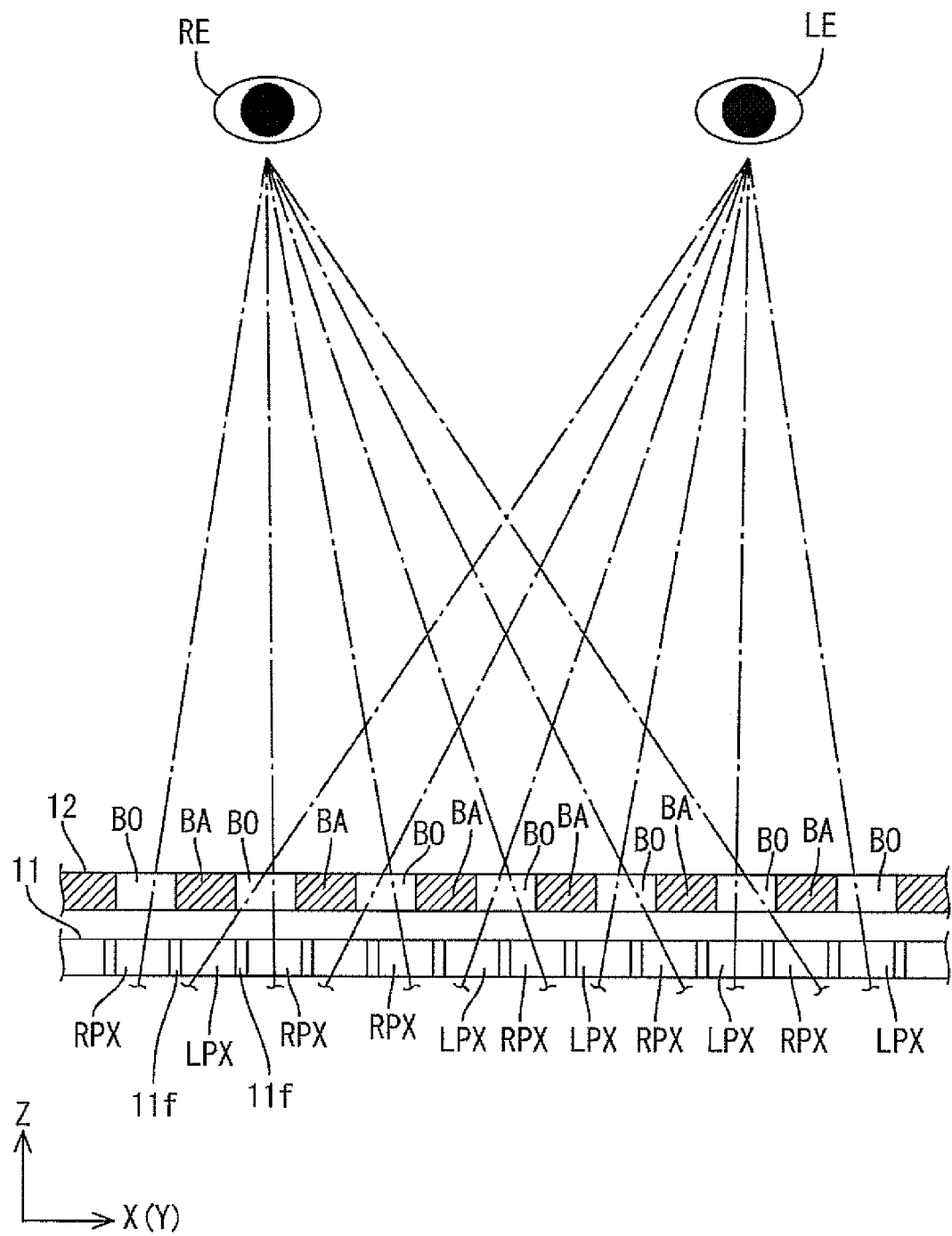
FIG. 10 is an explanatory view schematically illustrating a relationship among eyes of a user, barrier sections and barrier openings of a parallax barrier, and pixels for right eye and left eye.

Specifically, when the liquid crystal display device 10 is placed in the portrait orientation, a reference potential is supplied to the second transparent electrode for barrier 24B, the third transparent electrode for barrier 24C, and the fourth transparent electrode for barrier 24D, and a predetermined potential different from the reference potential is supplied to the first transparent electrode for barrier 24A. This does not generate a potential difference among the second transparent electrode for barrier 24B, the third transparent electrode for barrier 24C, and the fourth transparent electrode for barrier 24D, but a potential difference is generated between the first transparent electrode for barrier 24A and the third and fourth transparent electrodes for barrier 24C, 24D. Accordingly, as illustrated in FIG. 10, the liquid crystal layer of the functional panel 12 has a minimum light transmissivity at areas that overlap with the first transparent electrode 24A in a plan view. These areas are the barrier sections BA that blocks light. The liquid crystal layer has a maximum light transmissivity at areas that overlap with the second transparent electrode for barrier 24B. These areas are barrier openings BO that allows the light to pass therethrough. The barrier sections BA and the barrier openings BO each have a stripe-like shape that extends in the Y-axis direction and are alternately arranged in the X-axis direction, like the band-like shape portions 24Ab, 24Bb of the first and second transparent electrodes for barrier 24A, 24B. Eyes LE, RE of the user are aligned in the arrangement direction of the barrier sections BA and the barrier openings BO (the X-axis direction) when the liquid crystal display panel 11 is placed in the portrait orientation. If the driving of the liquid crystal panel 11 is controlled to alternately display an image for left eye and an image for right eye on the pixels PX arranged in the X-axis direction, the barrier sections BA limits the viewing angle of the displayed image for right eye (pixels for right eye RPX) and the displayed image for left eye (pixels for left eye LPX). The images are separately seen by the right eye RE and the left eye LE through the barrier openings BO. This provides binocular disparity when the liquid crystal display panel 11 is used in the portrait position and enables the user to see the stereoscopic image.

In contrast, when the liquid crystal display device 10 is placed in the landscape orientation, a reference potential is supplied to the first transparent electrode for barrier 24A, the second transparent electrode for barrier 24B, and the fourth transparent electrode for barrier 24D, and a predetermined potential different from the reference potential is supplied to the third transparent electrode for barrier 24C. This does not generate a potential difference among the first transparent electrode for barrier 24A, the second transparent electrode for barrier 24B, and the fourth transparent electrode for barrier 24D, but a potential difference is generated between the first and second transparent electrodes for barrier 24A, 24B and the third transparent electrode for barrier 24C. Accordingly, as illustrated in FIG. 10, the liquid crystal layer of the functional panel 12 has a minimum light transmissivity at areas that overlap with the third transparent electrode 24C in a plan view. These areas are the barrier sections BA that blocks light. The liquid crystal layer has a maximum light transmissivity at areas that overlap with the fourth transparent electrode for barrier 24D. These areas are barrier openings BO that allows the light to pass therethrough. The barrier sections BA and the barrier openings BO each have a stripe-like shape that extends in the X-axis direction and are alternately arranged in the Y-axis direction, like the band-like shape portions 24Ca of the third transparent electrode for barrier 24C and the band-like shape portions 24Da of the fourth transparent electrode for barrier 24D. Eyes LE, RE of the user are aligned in the arrangement direction of the barrier sections BA and the barrier openings BO (the Y-axis direction bracketed in FIG. 10) when the liquid crystal display panel 11 is placed in the landscape orientation. If the driving of the liquid crystal panel 11 is controlled to alternately display an image for left eye and an image for right eye on the pixels PX arranged in the Y-axis direction, the barrier sections BA limits the viewing angle of the displayed image for right eye (pixels for right eye RPX) and the displayed image for left eye (pixels for left eye LPX). The images are separately seen by the right eye RE and the left eye LE through the barrier openings BO. This provides binocular disparity when the liquid crystal display panel 11 is used in the landscape position and enables the user to see the stereoscopic image.

The liquid crystal display device 10 that can display the stereoscopic image when placed in either the portrait orientation or the landscape orientation may include a gyro scope, which is not illustrated, to determine the orientation of the liquid crystal display device 10 (whether in the portrait orientation or in the landscape orientation). The liquid crystal panel 11 and the functional panel 12 may be automatically switched between a portrait mode and a landscape mode based on the determination. When a flat image is required to be seen by the user, a reference potential is applied to all of the electrodes 24A to 24D. This does not generate a potential difference between first and second transparent electrodes 24A, 24B and the third and fourth transparent electrodes 24C, 24D and thus the entire area of the liquid crystal layer has the maximum light transmissivity. That is, the functional barrier 12 does not include the barrier sections BA that blocks light. Accordingly, the image displayed on the pixels PX of the liquid crystal panel 11 does not have the parallax, so that the user can see the flat image (the 2D image, the two-dimensional image). No potential may be supplied to all of the electrodes 24A to 24D such that no potential difference is generated between the first and second transparent electrodes 24A, 24B and the third and fourth transparent electrodes 24C, 24D.

As illustrated in FIG. 8 and FIG. 9, in addition to the above-described transparent electrode for barrier 24, light blocking lines for barrier 25 are arranged on the inner surfaces (the plate surfaces on a liquid crystal layer side) of the substrates 12a, 12b included in the functional panel 12. Like the gate lines 18 and the source lines 19 of the liquid crystal panel 11, the light blocking lines for barrier 25 are made of light shielding metal material such as copper or titanium and arranged in the display non-overlapping area ONAA of the functional panel 12. The light blocking lines for barrier 25 include potential supply lines for barrier 26 and a ground line for barrier 27. The potential supply lines for barrier 26 are configured to supply voltage to the above transparent electrodes for barrier 24. The ground line for barrier 27 shields the transparent electrodes for barrier 24 and the potential supply lines for barrier 26. Ends of the potential supply line for barrier 26 and the ground line for barrier 27 are located at an end portion of the first substrate 12a in the long-side direction to which a flexible substrate for barrier 28 is attached with pressure. The ends of the potential supply line for barrier 26 and the ground line for barrier 27 are connected to the flexible substrate for barrier 28. Connecting portions between the flexible substrate for barrier 28 and the potential supply lines for barrier 26 are referred to as terminals 26a, and connecting portions between the flexible substrate for barrier 28 and the ground line for barrier 27 are referred to as terminals 27a (see FIG. 11). The flexible substrate for barrier 28 is connected to the terminals 26a of the potential supply lines for barrier 26 and the terminals 27a of the ground line for barrier 27 at one end thereof via an anisotropic conductive film ACF, and is connected to a control substrate, which is not illustrated, at the other end. This allows the potential supplied from the control substrate to be transmitted to the potential supply lines for barrier 26 and the ground line for barrier 27. As illustrated in FIG. 7, the second substrate 12b has a long side that is shorter than that of the first substrate 12a. The second substrate 12b is attached to the first substrate 12a such that the end in the long-side direction thereof, which is remote from the flexible substrate for barrier 28, is aligned with the end of the first substrate 12a.

Figure 12:
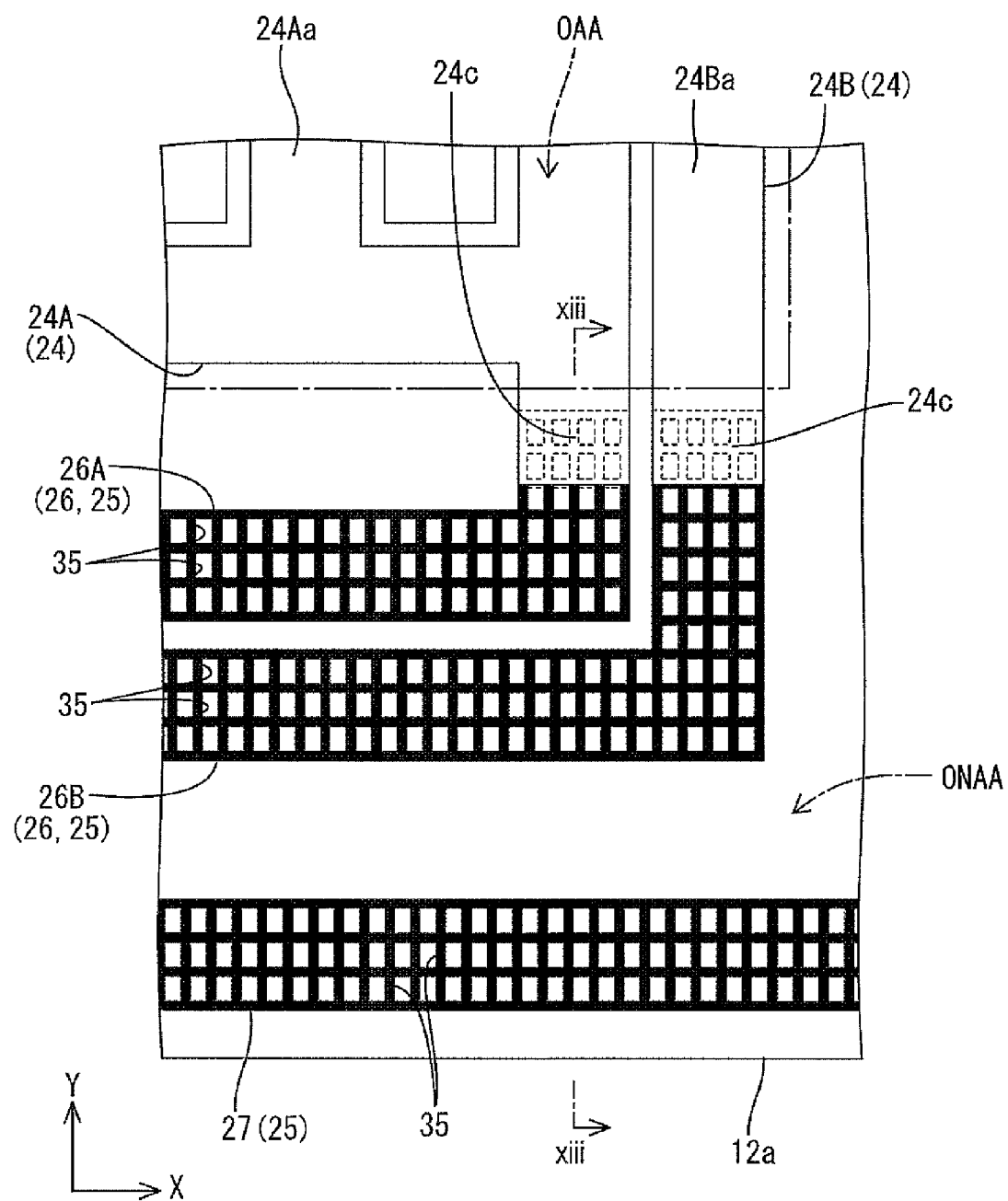
FIG. 12 is a magnified plan view illustrating an area around a connection between the light blocking lines for barrier and transparent electrodes for barrier.
Figure 13:
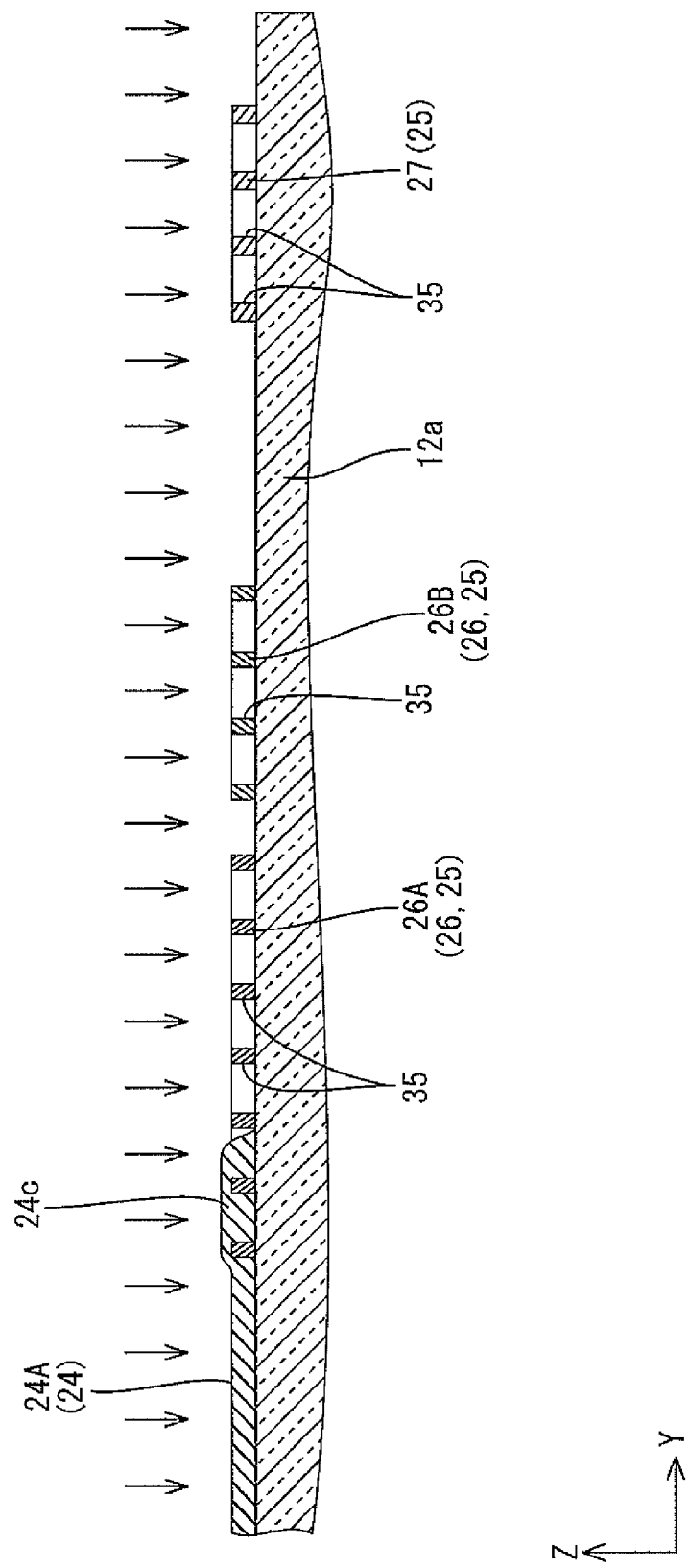
FIG. 13 is a cross sectional view taken along a line xiii-xiii in FIG. 12.

An end of each potential supply line for barrier 26 that is remote from the flexible substrate for barrier 28 is connected to an end of the transparent electrode for barrier 24. Specifically, as illustrated in FIG. 12 and FIG. 13, an extension connection 24c extends from the transparent electrode for barrier 24 in the display overlapping area OAA toward the display non-overlapping area ONAA and is connected to the potential supply line for barrier 26 in the display non-overlapping area ONAA. The potential supply line for barrier 26 made of light shielding metal material is not arranged in the display overlapping area OAA, and thus the potential supply line for barrier 26 hardly lowers the opening ratio (light transmissivity) in the display overlapping area OAA. In FIG. 12 and FIG. 13, although only the connection between the first transparent electrode for barrier 24A and a first potential supply line for barrier 26A, and the connection between the second transparent electrode for barrier 24B and a second potential supply line for barrier 26B are illustrated, the connection between the third transparent electrode for barrier 24C and a third potential supply line for barrier 26C and the connection between the fourth transparent electrode for barrier 24D and a fourth potential supply line for barrier 26D are the same as the above.

The potential supply lines for barrier 26 include four of the potential supply lines for barrier 26 for four of the transparent electrodes for barrier 24A, 24B, 24C, and 24D included in the transparent electrode for barrier 24. Specifically, the first potential supply line for barrier 26A is connected to the first transparent electrode for barrier 24A, the second potential supply line for barrier 26B is connected to the second transparent electrode for barrier 24B, the third potential supply line for barrier 26C is connected to the third transparent electrode for barrier 24C, and the fourth potential supply line for barrier 26D is connected to the fourth transparent electrode for barrier 24D. As illustrated in FIG. 8, the first potential supply line for barrier 26A and the second potential supply line for barrier 26B are routed from the portion connected to the flexible substrate for barrier 28 to an end of the first transparent electrode for barrier 24A and an end of the second transparent electrode for barrier 24B in the display non-overlapping area ONAA of the first substrate 12a, respectively. As illustrated in FIG. 8 and FIG. 9, the third potential supply line for barrier 26C and the fourth potential supply line for barrier 26D are each divided into two parts, that is, one part on the first substrate 12a side and the other part on the second substrate 12b side. In attachment of the substrates 12a and 12b, the divided parts are each connected at corresponding ends thereof via conductive beads (not illustrated) made of conductive metal material such as gold. Specifically, the third potential supply line for barrier 26C and the fourth potential supply lines for barrier 26D each include a first part and a second part. As illustrated in FIG. 9, one end of each first part is connected to the end of the third transparent electrode for barrier 24C or the fourth transparent electrodes for barrier 24D in the display non-overlapping area ONAA of the second substrate 12b. As illustrated in FIG. 8, each second part extends in the display non-overlapping area ONAA of the first substrate 12a from the connecting portion with the flexible substrate for barrier 28 toward an area that overlaps with the end of each first part on the second substrate 12b in a plan view. The overlapping portions between the first parts and the second parts are connected together with the conductive beads.

As illustrated in FIG. 8, the ground line for barrier 27 is arranged in the display non-overlapping area ONAA of the first substrate 12a in a circular shape and surrounds the potential supply lines for barrier 26, which are the light blocking lines for barrier 25, in addition to the display overlapping area OAA. The ground line for barrier 27 is grounded via the flexible substrate for barrier 28, and thus all of the transparent electrodes for barrier 24 in the display overlapping area OAA and the potential supply lines for barrier 26 are collectively shielded. Specifically, the ground line for barrier 27 is arranged in the display non-overlapping area ONAA of the first substrate 12a along the display overlapping area OAA and has a rectangular frame-like shape that has a closed end.

As described above, the potential supply lines for barrier 26 for supplying potential to the transparent electrodes for barrier 24 and the ground line for barrier 27 for shielding are made of light shielding metal material that has a low line resistance and high uniformity compared to the light transmissive conductive material such as ITO that is the material of the transparent electrodes for barrier 24. Accordingly, potential is stably supplied to the transparent electrodes for barrier 24 by the potential supply lines for barrier 26 that are made of the light shielding metal material, and the transparent electrodes for barrier 24 are stably shielded by the ground line for barrier 27 that is made of the light shielding metal material.

Figure 11:
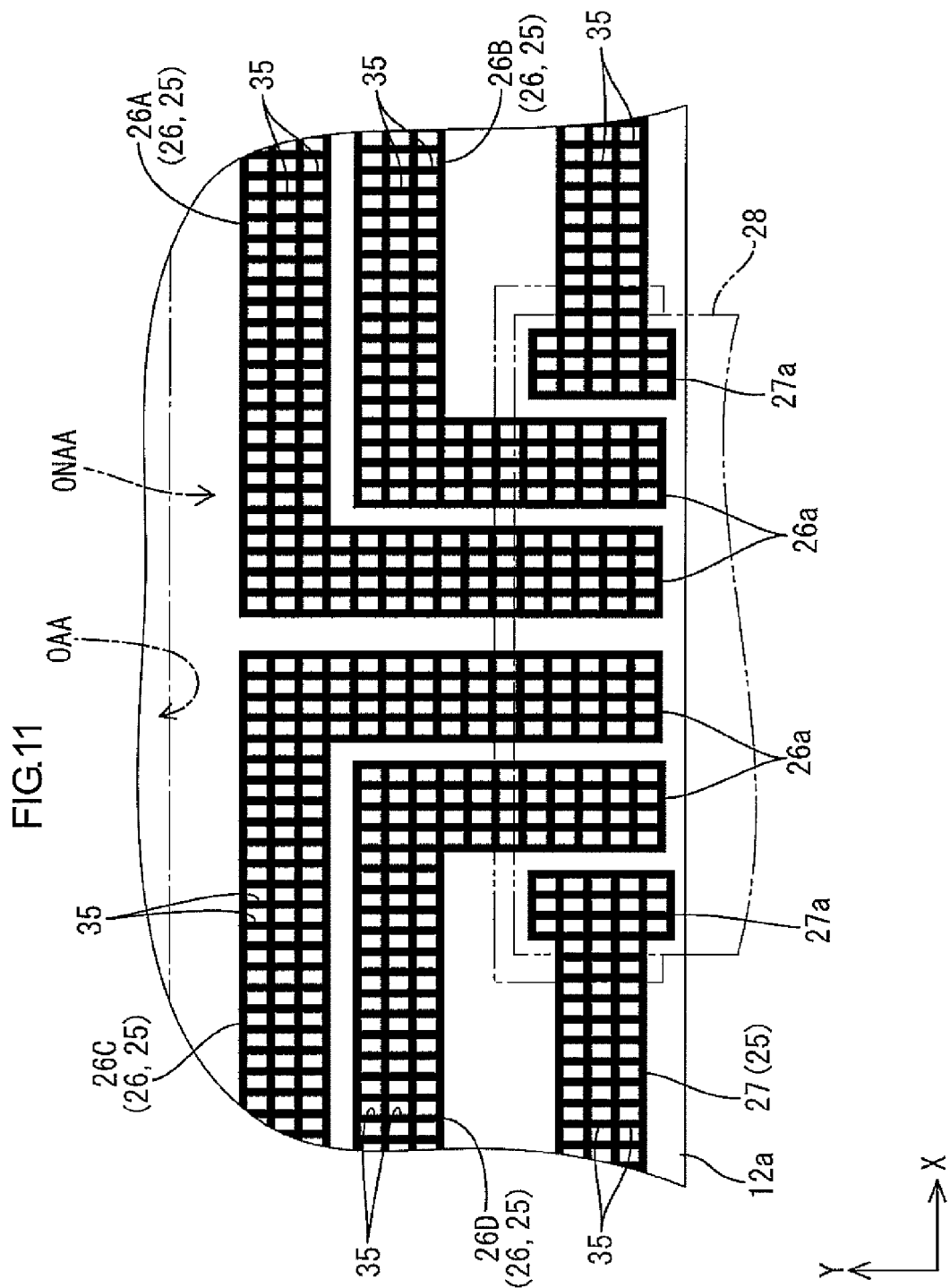
FIG. 11 is a magnified plan view illustrating an area around terminals of light blocking lines for barrier.

Subsequently, the "touch panel function (position input function)" of the functional panel 12 is described in detail. As illustrated in FIG. 11, transparent electrodes for touch panel 29 are arranged on an outer surface, which faces the front side (a plate surface opposite from the surface on the liquid crystal side, a plate surface opposite from the surface on which the transparent electrodes 24 are provided), of the second substrate 12b that is the front side (the user side) substrate of the substrates 12a, 12b included in the functional panel 12. The transparent electrodes for touch panel 29 constitute the touch panel pattern of a projected capacitive type. Like the transparent electrode for barrier 24, the transparent electrode for touch panel 29 is made of a transparent conductive material that is almost transparent, for example, ITO, and is arranged in the display overlapping area OAA of the functional panel 12. With this configuration, the display overlapping area OAA of the functional panel 12 has the high light transmissivity, and the light passed through the display area AA of the liquid crystal panel 11 can pass therethrough with low loss. The transparent electrodes for touch panel 29 include first transparent electrodes for touch panel 29A that extend in the long-side direction of the second substrate 12b (the Y-axis direction) and second transparent electrodes for touch panel 29B that extend in the short-side direction of the second substrate 12b (the X-axis direction).

Figure 15:
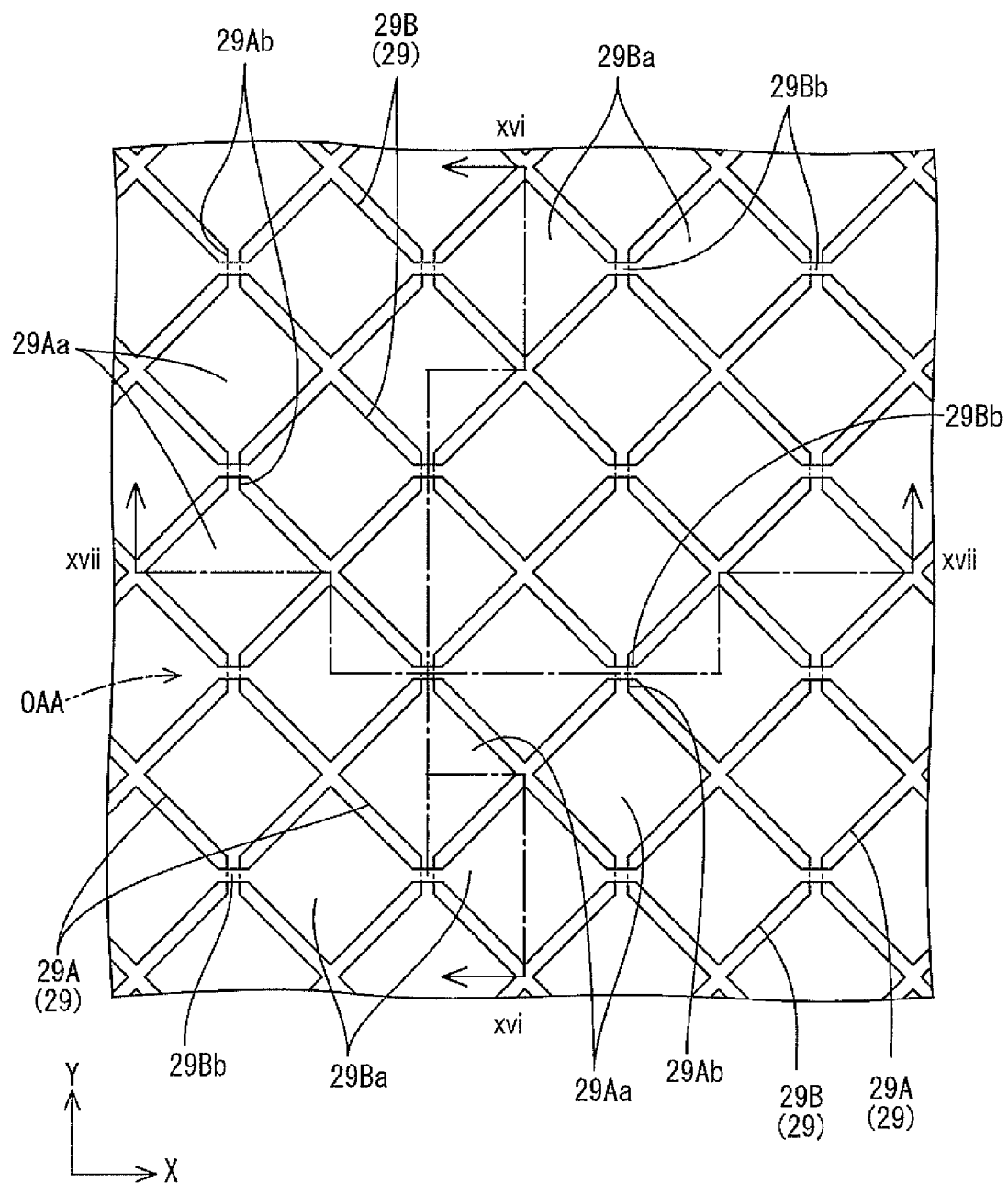
FIG. 15 is a plan view illustrating a plan arrangement of a touch panel pattern.

As illustrated in FIG. 15, each first transparent electrode for touch panel 29A includes first electrode pads 29Aa and first connection portions 29Ab. The first electrode pads 29Aa each have a rhomboid shape in a plan view and are arranged along the Y-axis direction. The first connection portions 29Ab connect adjacent first electrode pads 29Aa. The first transparent electrodes for touch panel 29A that extend in the Y-axis direction are arranged in the X-axis direction with a predetermined space therebetween. In contract, each second transparent electrode for touch panel 29B includes second electrode pads 29Ba and second connection portions 29Bb. The second electrode pads 29Ba each have a rhomboid shape in a plan view and are arranged along the X-axis direction. The second connection portions 29Bb connect adjacent second electrode pads 29Ba. The second transparent electrodes for touch panel 29B that extend along the X-axis direction are arranged in the Y-axis direction with a predetermined space therebetween. On the second substrate 12b, the first electrode pads 29Aa constituting the first transparent electrodes for touch panel 29A and the second electrode pads 29Ba constituting the second transparent electrodes for touch panel 29B are respectively arranged in a matrix in the X-axis direction and the Y-axis direction.

Figure 16:
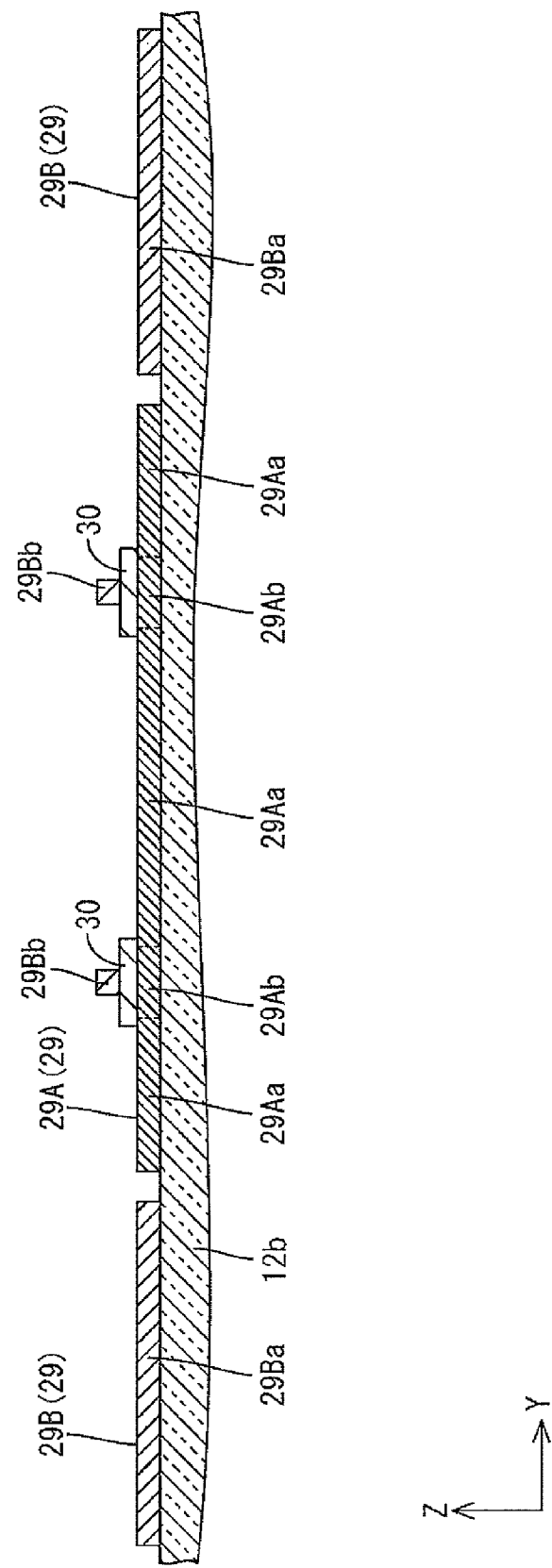
FIG. 16 is a cross-sectional view taken along a line xvi-xvi in FIG. 15.
Figure 17:
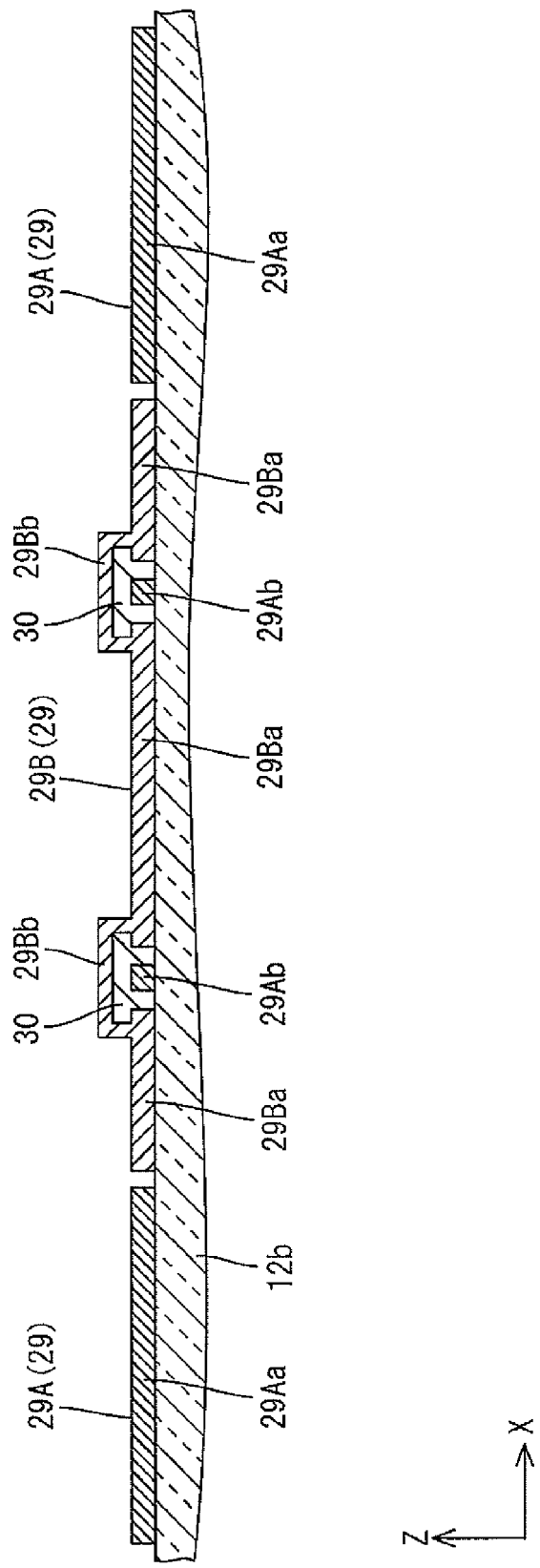
FIG. 17 is a cross-sectional view taken along a line xvii-xvii in FIG. 15.

As illustrated in FIG. 16, the first electrode pads 29Aa and the first connection portions 29Ab that constitute the first transparent electrode for touch panel 29A and the second electrode pads 29Ba constituting the second transparent electrode for touch panel 29B are arranged in the same layer on the second substrate 12b. In contrast, as illustrated in FIG. 17, the second connection portions 29Bb that constitute the second transparent electrode for touch panel 29B are arranged above the first connection portions 29Ab with an insulation layer 30 therebetween. With this configuration, the first transparent electrode for touch panel 29A and the second transparent electrode for touch panel 29B are hardly shunted at an intersection thereof.

The above-described first transparent electrodes for touch panel 29A and second transparent electrodes for touch panel 29B are connected to a detecting circuit, which is not illustrated, via light blocking lines for touch panel 31, which will be described later. When a user places a finger, which is a conductive body, near an operation screen of the functional panel 12 or touches the operation screen with the finger while the voltage is applied to the first transparent electrodes for touch panel 29A in rows and the second transparent electrodes for touch panel 29B in rows, the finger of the user and any of the first and second transparent electrodes for touch panel 29A, 29B generate a capacitance therebetween. The generated capacitance at one of the transparent electrodes for touch panel 29A, 29B is different from that of the other transparent electrodes for touch panel 29A, 29B. The detecting circuit determines the transparent electrode for touch panel 29A, 29B that has the capacitance difference, and the coordinate of the intersection between the transparent electrodes for touch panel 29A, 29B is input as two-dimensional (the X-axis direction and the Y-axis direction) location information regarding the operation position of the user. Thus, the multi-functional panel 12 can detect multiple points (multi-touch) at the same time where the user inputs location information on the surface of the operation screen.

Figure 14:
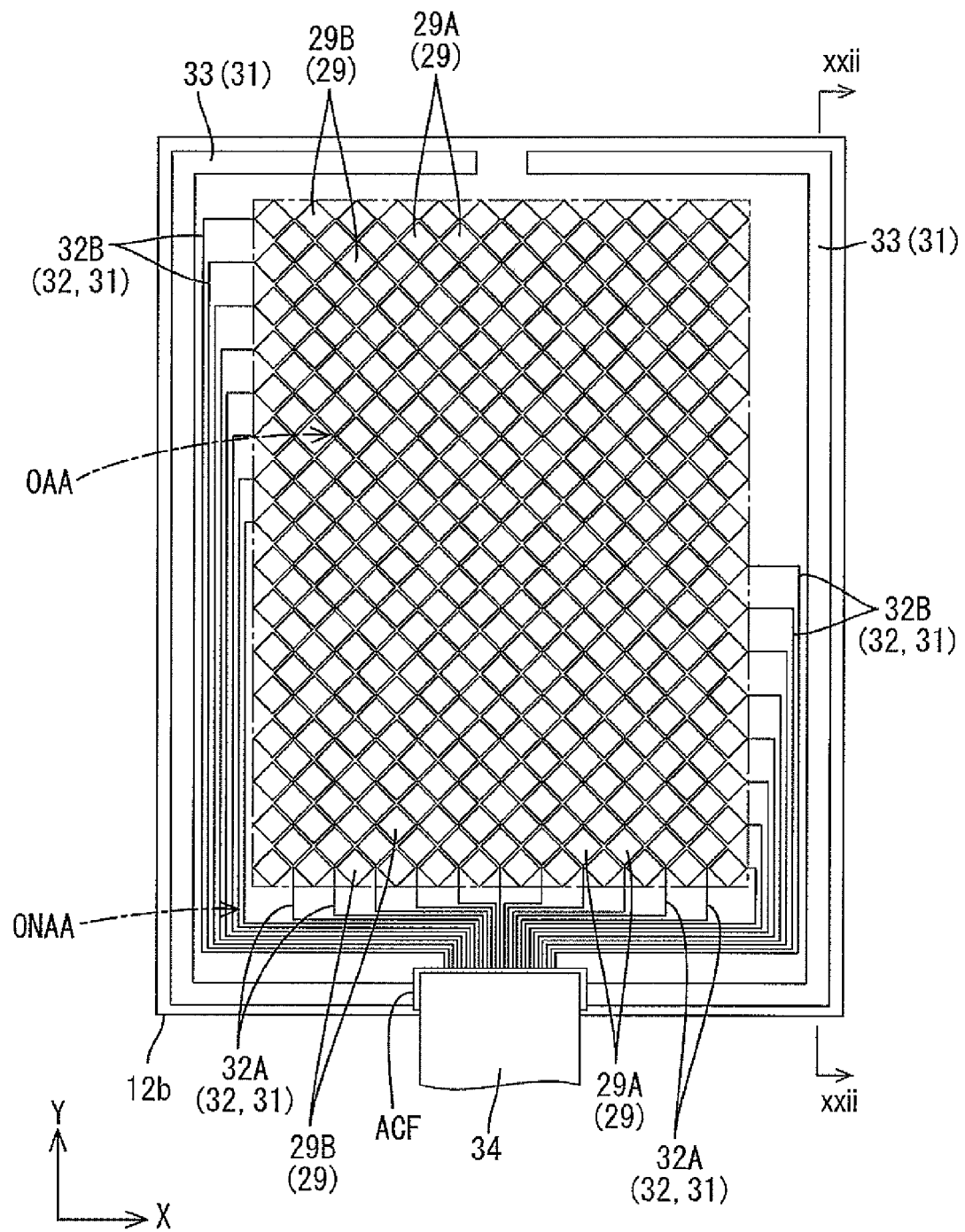
FIG. 14 is a plan view illustrating the second substrate included in the functional panel.
Figure 18:
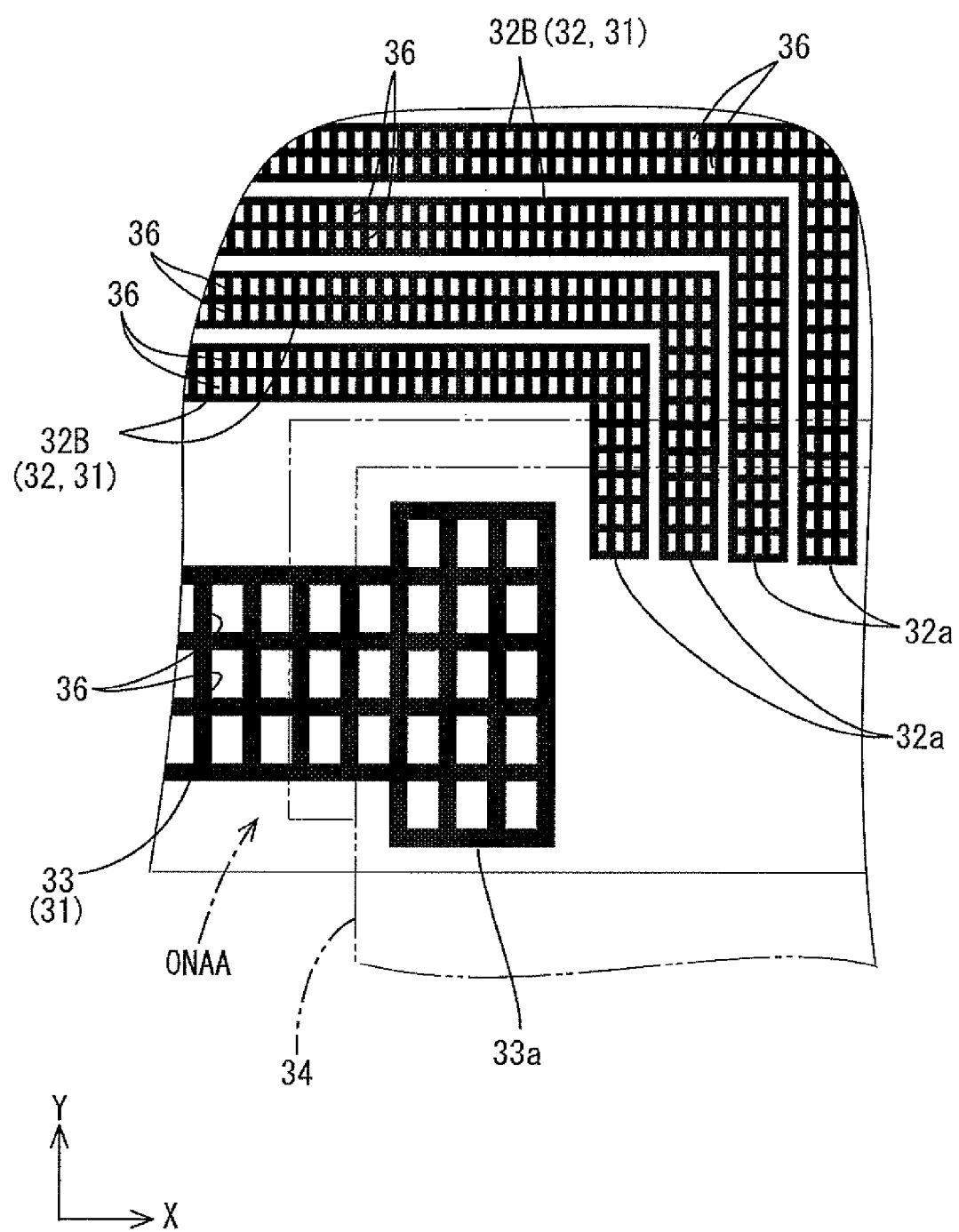
FIG. 18 is a magnified plan view illustrating an area around terminals of light blocking lines for touch panel.

As illustrated in FIG. 14, on the outer front surface of the second substrate 12b facing the front side, the light blocking lines for touch panel 31 are arranged in addition to the above-described transparent electrode for touch panel 29. Like the light blocking lines for barrier 25, the light blocking lines for touch panel 31 are made of light shielding metal material such as copper or titanium and are arranged in the display non-overlapping area ONAA of the functional panel 12. The light blocking lines for touch panel 31 include potential supply lines for touch panel 32 and a ground line for touch panel 33. The potential supply lines for touch panel 32 supply potential to the above-described transparent electrode for touch panel 29. The ground line for touch panel 33 shields the transparent electrodes for touch panel 29 and the potential supply lines for touch panel 32. Ends of the potential supply line for touch panel 32 and the ground line for touch panel 33 are arranged at an end portion of the second substrate 12b in the long-side direction where a flexible substrate for touch panel 34 is attached with pressure. Connected portions between the potential supply lines for touch panel 32 and the flexible substrate for touch panel 34 are referred to as terminals 32a, and connected portion between the ground line for touch panel 33 and the flexible substrate for touch panel 34 is referred to as a terminal 33a (FIG. 18). The flexible substrate for touch panel 34 is connected to terminals 32a of the potential supply lines for touch panel 32 and the terminal 33a of the ground line for touch panel 33 at one end thereof via an anisotropic conductive film. ACF, and connected to a control substrate, which is not illustrated, at the other end. This enables potential supplied from the control substrate to be transmitted to the potential supply lines for touch panel 32 and the ground line for touch panel 33. The control substrate is provided with the above-described detecting circuit.

Figure 19:
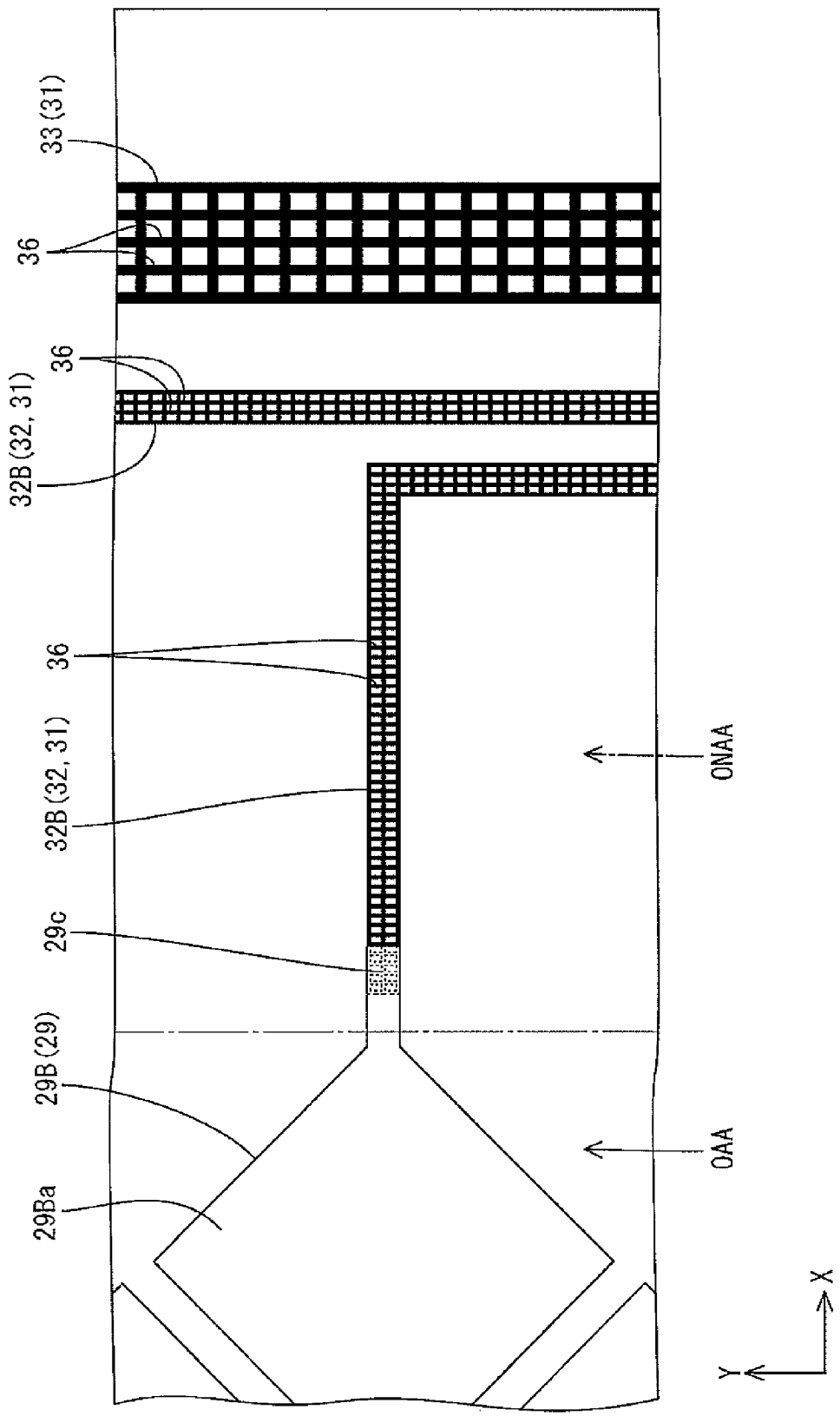
FIG. 19 is a magnified plan view illustrating an area around a connection between the light blocking lines for touch panel and transparent electrodes for touch panel.
Figure 20:
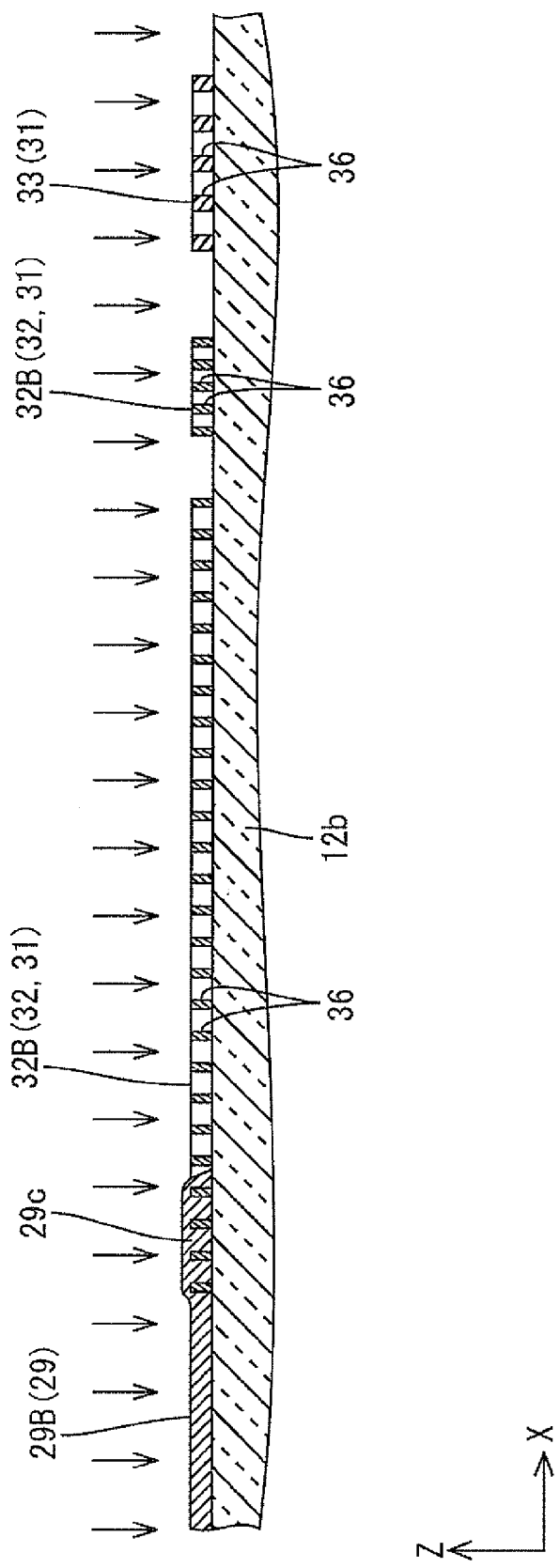
FIG. 20 is a cross-sectional view taken along a line xx-xx in FIG. 19.

An end of each potential supply line for touch panel 32 that is the end remote from the flexible substrate for touch panel 34 is connected to an end of the transparent electrode for touch panel 29. Specifically, as illustrated in FIG. 19 and FIG. 20, an extension connector 29c extends from the transparent electrode for touch panel 29 in the display overlapping area OAA toward the display non-overlapping area ONAA and is connected to the potential supply line for touch panel 32 in the display non-overlapping area ONAA. The potential supply line for touch panel 32 made of the light shielding metal material is not arranged in the display overlapping area OAA so that the potential supply line for touch panel 32 hardly lowers the opening ratio (light transmissivity) in the display overlapping area OAA. In FIG. 19 and FIG. 20, although only the connection between the second transparent electrode for touch panel 29B and a second potential supply line for touch panel 32B is illustrated, the connection between the first transparent electrode for touch panel 29A and a first potential supply line for touch panel 32A is the same as the above.

As illustrated in FIG. 14, the potential supply line for touch panel 32 includes two kinds of the potential supply line for touch panel 32 for two of the transparent electrodes for touch panel 29A and 20B included in the transparent electrode for touch panel 29. Specifically, the first potential supply lines for touch panel 32A that are connected to the corresponding first transparent electrodes for touch panel 29A and the second potential supply lines for touch panel 32B that are connected to the corresponding second transparent electrodes for touch panel 29B. The first potential supply lines for touch panel 32A are routed from the portions connected to the flexible substrate for touch panel 34 to ends of the first transparent electrodes for touch panel 29A that are on the flexible substrate for touch panel 34 side in the display non-overlapping area of the second substrate 12b. The first potential supply lines for touch panel 32A are arranged in an area along one of the short sides of the display non-overlapping area ONAA, which has a frame-like shape, on the flexible substrate for touch panel 34 side. The first potential supply lines for touch panel 32A are connected to the middle of the flexible substrate for touch panel 34 in the width direction thereof.

The second potential supply lines for touch panel 32B are routed from the portions connected to the flexible substrate for touch panel 34 to one end of each second transparent electrode for touch panel 29B in the display non-overlapping area of the second substrate 12b. The second potential supply lines for touch panel 32B include two types of the second potential supply lines 32B in the display non-overlapping area ONAA in a frame-like shape. One type thereof extends along the short side on the flexible substrate for touch panel 34 side and one of the long sides of the display non-overlapping area ONAA. The other type thereof extends along the short side on the flexible substrate for touch panel 34 side and the other one of the long sides of the display non-overlapping area ONAA. Specifically, the second potential supply lines for touch panel 32B that are arranged along the long side on the left of the display non-overlapping area ONAA in FIG. 14 are connected to the upper half of the respective second transparent electrodes for touch panel 22B that are arranged along the long side (the Y-axis direction) of the second substrate 12b in FIG. 14. Similarly, the second potential supply lines for touch panel 32B that are arranged along the long side on the right of the display non-overlapping area ONAA in FIG. 14 are connected to the lower left of the respective second transparent electrodes for touch panel 29B in FIG. 14.

As illustrated in FIG. 14, the ground line for touch panel 33 extends in the display non-overlapping area ONAA in a circular shape and surrounds the potential supply lines for touch panel 33, which is the light blocking lines for touch panel 31, in addition to the display overlapping area OAA. The ground line for touch panel 33 is grounded via the flexible substrate for touch panel 34, and thus all of the transparent electrodes for touch panel 29 in the display overlapping area OAA and the potential supply lines for touch panel 32 are collectively shielded. Specifically, the ground line for touch panel 33 in the display non-overlapping area ONAA are arranged along the display overlapping area OAA of the second substrate 12b, and thus the ground line for touch panel 33 forms a rectangular frame-like shape in a plan view. The ground line for touch panel 33 has a cutout having a predetermined length at a middle portion on a side opposite from the flexible substrate for touch panel 34 side.

As described above, the potential supply lines for touch panel 32 for supplying potential to the transparent electrodes for touch panel 29 and the ground line for touch panel 33 for shielding are made of light shielding metal material that has a low line resistance and high uniformity compared to the light transmissive conductive material such as ITO that is the material of the transparent electrodes for touch panel 29. Accordingly, potential is stably supplied to the transparent electrodes for touch panel 29 by the potential supply lines for touch panel 32 made of the light shielding metal material, and the transparent electrodes for touch panel 29 and the potential supply lines for touch panel 32 are stably shielded by the ground line for touch panel 33 made of the light shielding metal material.

As illustrated in FIG. 3 and FIG. 4, the photo curable adhesive GL that is used to attach the liquid crystal panel 11 and the functional panel 12 together is applied to an area in a plan view that is substantially the same as the area of the CF substrate 11a and the polarizing plate 11d on the front side of the liquid crystal panel 11. The photo curable adhesive GL is applied over the entire areas of the display area AA and the display overlapping area OAA and over a large part of the non-display area NAA and the display non-overlapping area ONAA (specifically, except for the end portions to which the flexible substrates 32, 28, 34 are connected). In the attachment, ultra violet rays are applied to the functional panel 12 from the front side to cure the photo curable adhesive GL. The transparent electrodes 24, 29 made of the light transmissive conductive material are arranged in the display overlapping area OAA. Thus, the opening ratio of the display overlapping area OAA is sufficiently high and the sufficient amount of light is applied to the photo curable adhesive GL. On the other hand, since the light blocking lines 25, 31 that are made of the light shielding metal material are arranged in the display non-overlapping area ONAA, the opening ratio of the display non-overlapping area ONAA is lower than that of the display overlapping area OAA by an area corresponding to the light blocking lines 25, 31. In such a configuration, the amount of light to be applied to the photo curable adhesive GL may be insufficient.

As illustrated in FIG. 11, FIG. 12, FIG. 18, and FIG. 19, the light blocking lines 25, 31 of the present embodiment have light transmission cutouts 35, 36 that allow light to pass therethrough. The light transmission cutouts 35, 36 each have a vertically long rectangular shape in a plan view and have long sides and short sides that are smaller than the width of the light blocking lines 25, 31. The light transmission cutouts 35, 36 are aligned in the longitudinal direction and the width direction of the light blocking lines 25, 31, and arranged in a net-like shape in a plan view. The light transmission cutouts 35, 36 have the same size in a plan view and have a constant arrangement pitch with an equal distance therebetween. That is, the net-like portion of each light blocking line 25, 31 has a constant width over the entire area, and thus breaking is less likely to occur in the light blocking lines 25, 31. The cutouts 35, 36 are provided over the entire length and the entire area of the light blocking lines 25, 31 including the terminals 26a and 27a, 32a and 33a (refer to FIG. 11 and FIG. 18) and the connecting portions with the transparent electrodes 24, 29 (refer to FIG. 12 and FIG. 19). Accordingly, the light blocking lines 25, 31 each have a constant line resistance over the entire length and area thereof. This configuration is advantageous to supply stable potential. In FIG. 18 to FIG. 20, although the light transmission cutouts 36 in the second potential supply line for touch panel 32B and the ground line for touch panel 33 included in the light blocking lines for touch panel 31 are illustrated, the first potential supply line for touch panel 32A has the light transmission cutouts 36 same as the above.

Figure 22:
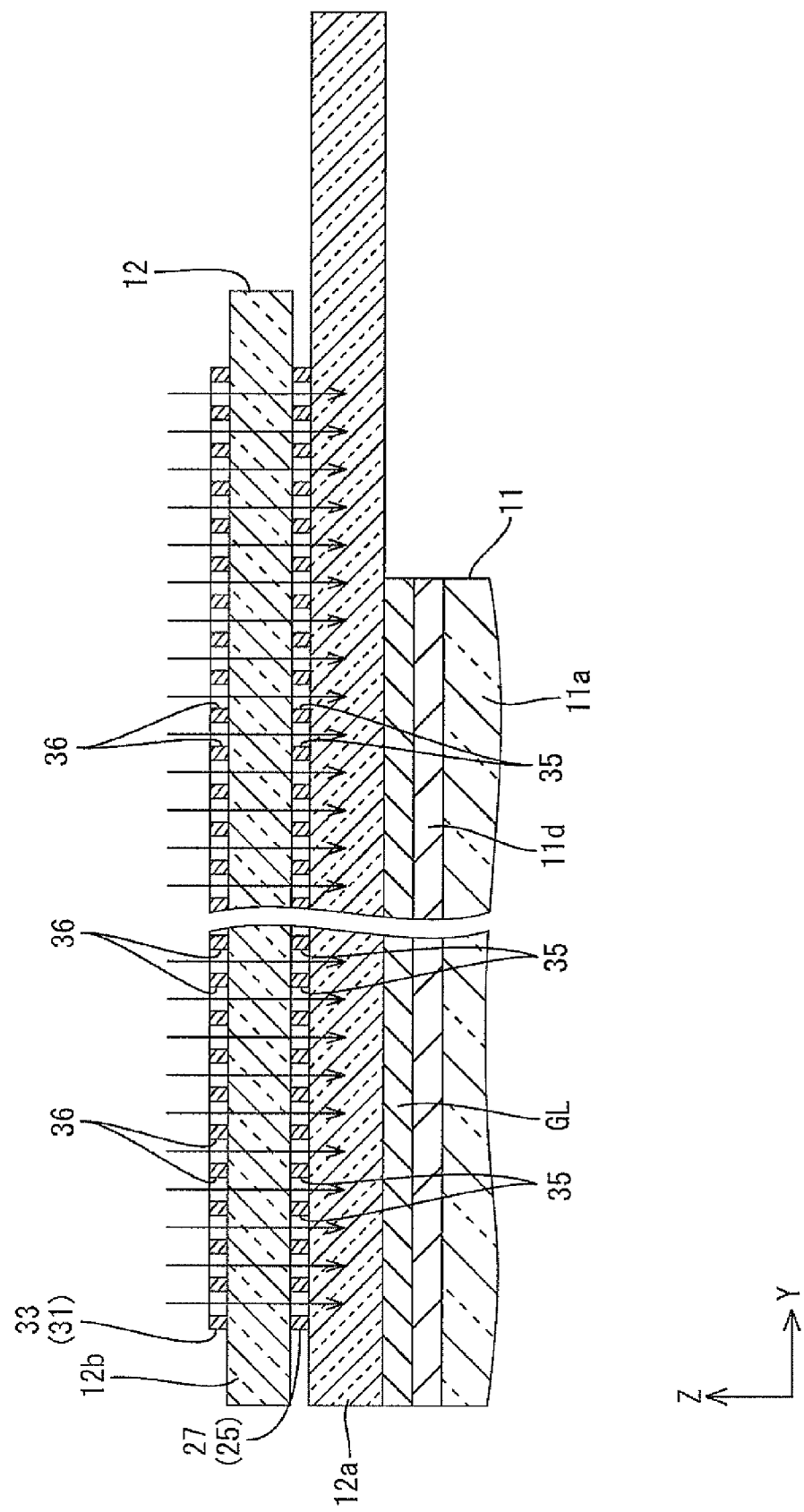
FIG. 22 is a cross-sectional view taken along a line xxii-xxii in FIG. 8 and FIG. 14 and illustrating a cross section of ground lines in a display non-overlapping area.

As illustrated in FIG. 8 and FIG. 14, the ground line for barrier 27 included in the light blocking lines 25 and the ground line for touch panel 33 included in the light blocking lines 31 have a substantially constant width over the entire area and are overlapped with each other over the entire length in a plan view. As illustrated in FIG. 22, the light transmission cutouts 35 provided in the ground line for barrier 27 and the light transmission cutouts 36 provided in the ground line for touch panel 33 are overlapped with each other in a plan view. Specifically, the light transmission cutouts (first light transparent cutouts) 35 provided in the ground line for barrier (a first light blocking line) 27 and the light transmission cutouts (second light transparent cutouts) 36 provided in the ground line (a second light blocking line) for touch panel 33 are designed to be aligned with each other in a plan view. In other words, the light transmission cutouts 35, 36 of one of the ground lines 27, 33 and the light transmission cutouts 35, 36 of the other one of the ground lines 27, 33 are arranged to overlap with each other. Light applied from the front side of the light transmission cutouts 36 of the ground line for touch panel 33 on the front side passes through the light transmission cutouts 35 of the ground line for barrier 27 on the rear side and reaches the photo cuing adhesive GL.

The present embodiment has the above-described configuration and the operation of the present embodiment will be described. In the production of the liquid crystal display panel 10 having the above configuration, the liquid crystal panel 11 and the functional panel 12 that are separately manufactured are used. The flexible substrates 21, 28, and 34 are attached to the corresponding liquid crystal panel 11 and functional panel 12. Then, the liquid crystal panel 11 and the functional panel 12 are attached with the photo curable adhesive GL.

Figure 21:
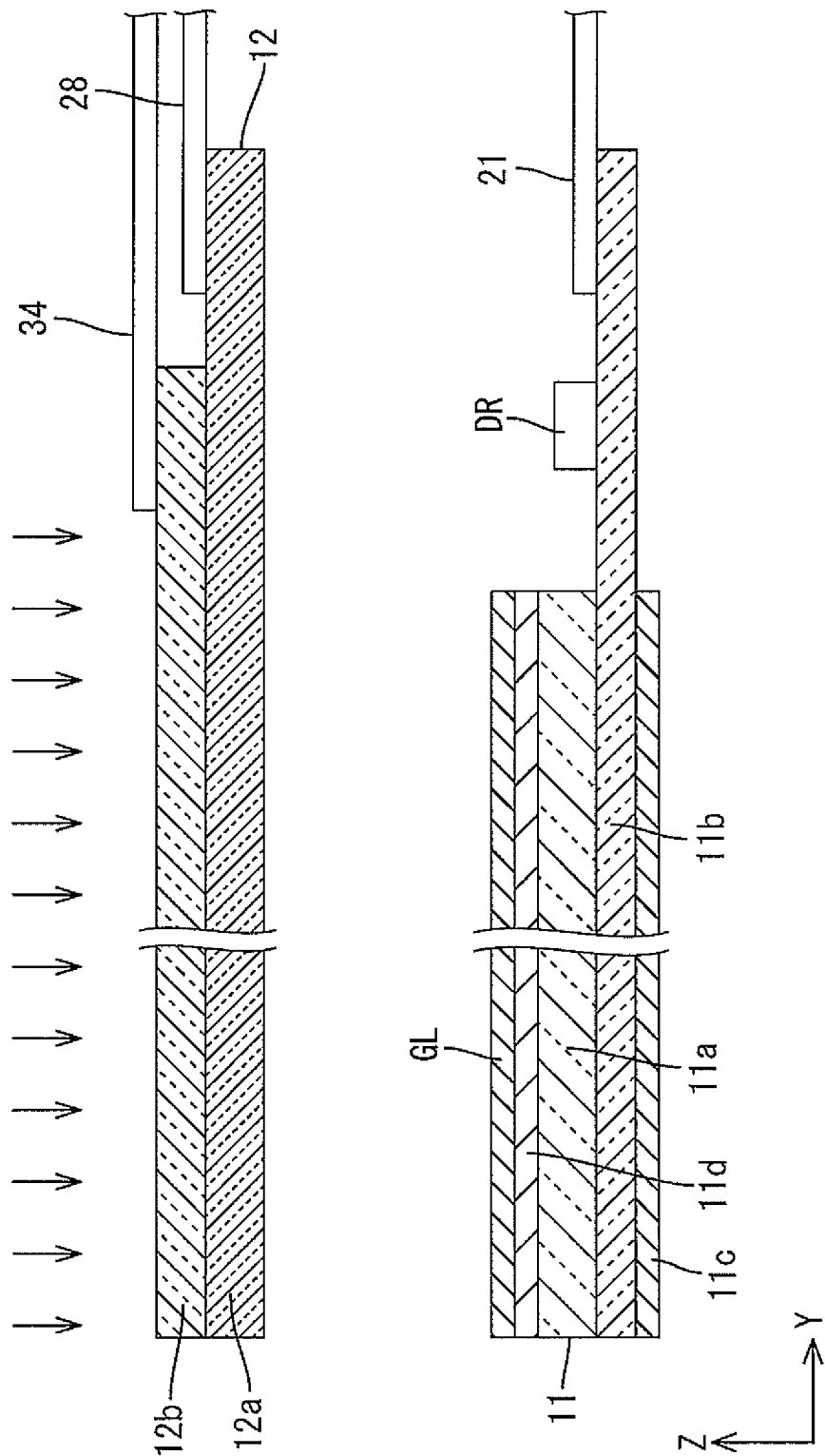
FIG. 21 is a cross-sectional view of the liquid crystal panel and the functional panel that are not attached together.
Figure 23:
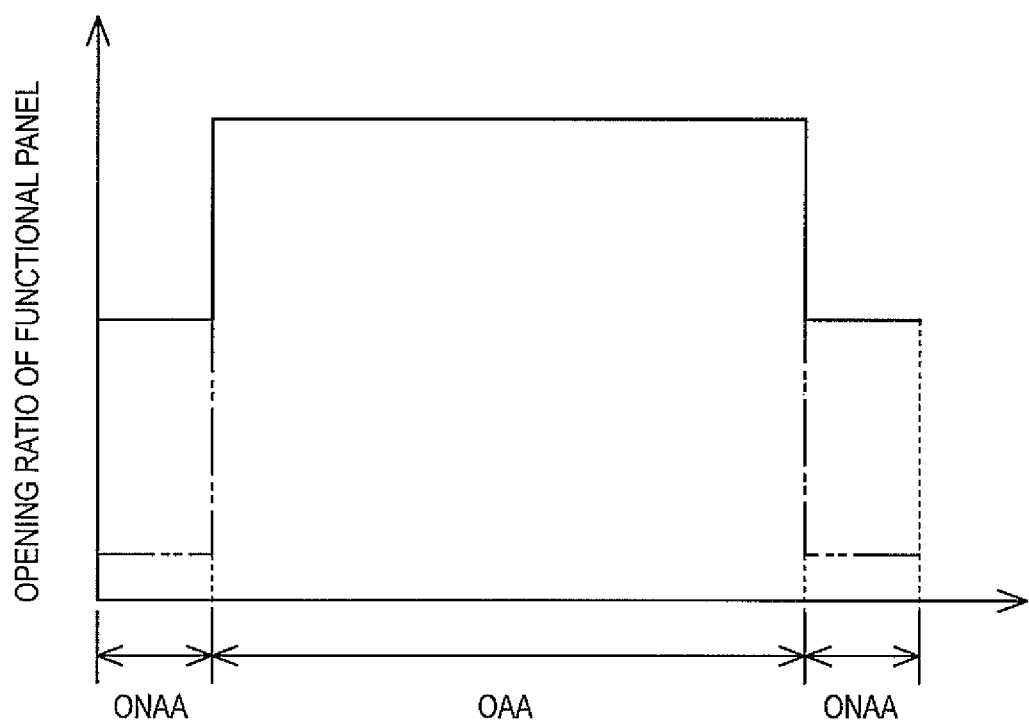
FIG. 23 is a graph indicating changes in an opening ratio of the functional panel in a short-side direction.

Specifically, as illustrated in FIG. 21, the photo curable adhesive GL is applied to the outer surface of the front polarizing plate 11d that is included in the liquid crystal panel 11 to which the flexible substrate for panel 21 is attached. Then, the functional panel 12 to which the flexible substrate for barrier 28 and the flexible substrate for touch panel 34 are attached is arranged to face the front side of the liquid crystal panel 11. The functional panel 12 at this stage does not include the polarizing plate 12c because the polarizing plate 12c absorbs ultra violet rays, which will be described in later, applied to the functional panel 12. The liquid crystal panel 11 and the functional panel 12 without the polarizing plate 12c in this state are attached to each other, and then the ultra violet rays are applied to the front side of the functional panel 12. In FIG. 13 and FIGS. 20 to 22, arrows indicate the application direction and the application area of ultra violet rays. The ultra violet rays applied to the functional panel 12 pass the transmissive members of the functional panel 12 and reach the photo curable adhesive GL, and thus the photo curable adhesive GL is cured. The opening ratio in the display overlapping area OAA of the functional panel 12 is sufficiently high because the transparent electrodes 24, 29 arranged therein are made of a light transmissive conductive material. The opening ratio in the display non-overlapping area ONAA is relatively low as illustrated in FIG. 23, because light blocking lines 25, 31 arranged therein are made of the light shielding metal material. In the present embodiment, the light blocking lines 25, 31 have the light transmission cutouts 35, 36 that are partial cutouts. The opening ratio in the display non-overlapping area ONAA is improved by the area corresponding to the light transmission cutouts 35, 36. In FIG. 23, the graph in a two-dotted chain line indicates the opening ratio of the display non-overlapping area ONAA that does not have the light transmission cutouts 35, 36.

With this configuration, the amount of light passing through the display non-overlapping area ONAA of the functional panel 12 can be increased, and thus the photo curable adhesive GL in an area overlapping with the display non-overlapping area ONAA in a plan view can be sufficiently cured. In other words, the light transmission cutouts 35, 36 decrease the difference in the amount of light passing through the display overlapping area OAA and that of the display non-overlapping area ONAA, and thus the level of curing of the photo curable adhesive GL cured by the light hardly varies depending on the areas. Further, the light transmission cutouts 35, 36 each are positioned in the light blocking lines 25, 31 at regular intervals in the longitudinal direction and the width direction, and thus the ultraviolet rays passed through the display non-overlapping area ONAA can further evenly reach the photo curable adhesive GL. As illustrated in FIG. 22, the light transmission cutouts 35, 36, which are in the ground lines 27, 33 that overlap with each other in a plan view, overlap and match with each other in a plan view, and thus, the ultra violet rays passed through the light transmission cutouts 36 of the ground line for touch panel 33 on the front side pass through the light transmission cutouts 35 of the ground line for barrier 27 on the rear side as it is. The ultra violet rays are applied to the photo curable adhesive GL with no loss. With this configuration, the ultra violet rays can be more efficiently applied to the photo curable adhesive GL.

As described above, the photo curable adhesive GL is sufficiently cured over the entire area thereof. Accordingly, the attachment of the liquid crystal panel 11 and the functional panel 12 is held with high holding power, and the panels 11 and 12 are hardly detached from each other. In addition to the above detachment, a semi-cured portion or an uncured portion is hardly formed in the photo curable adhesive GL in the display non-overlapping area ONAA, and thus a partial detachment of the liquid crystal panel 11 and the functional panel 12 hardly occurs. If the partial detachment of the liquid crystal panel 12 and the functional panel 12 occurs, the light may diffusely reflect at an interface of the detached portion and the light may leak from the display area AA of the liquid crystal panel 11. However, the above prevention of the partial detachment of the liquid crystal panel 11 and the functional panel 12 can maintain the high display quality. In addition, due to the prevention of the formation of the semi-cured portion or the uncured portion in the photo curable adhesive GL, the photo curable adhesive GL can have uniform thickness, and thus the display quality remains high. Further, if the photo curable adhesive GL has the uncured portion at an outer peripheral portion of the non-display area ONAA, the photo curable adhesive GL in liquid state may flow to the outside. However, the present embodiment can eliminate such a problem. After the panels 11, 12 are attached to each other as above, the polarizing plate 12c is attached to the functional panel 12, and then the protective cover panel 20 is attached to the front side of the functional panel 12. Subsequently, the integrated panel unit of panels 11, 12, and 20 is attached to the housing 15, which houses the backlight unit 13, via the bezel 14. This production process may be suitably changed. For example, in the attachment of the liquid crystal panel 11 and the functional panel 12, the photo curable adhesive GL may be applied to the functional panel 12, or the photo curable adhesive GL may be applied to each of the panels 11 and 12.

As described above, the liquid crystal display device (the display device) 10 of the present embodiment includes a liquid crystal display panel (the display panel) 11, a functional panel 12, a photo curable adhesive GL, transparent electrodes 24, 29, and light blocking lines 25, 31. The liquid crystal panel 11 includes a display area AA in which an image is displayed and a non-display area NAA surrounding the display area. The functional panel 12 is attached to the liquid crystal panel 11. The functional panel 12 includes a display overlapping area OAA overlapping with the display area AA in a plan view and a display non-overlapping area NOAA overlapping with the non-display area NAA in a plan view. The photo curable adhesive GL is between the liquid crystal panel 11 and the functional panel 12. The photo curable adhesive GL is cured by light applied thereto. The transparent electrodes 24, 29 are arranged in the display overlapping area OAA of the functional panel 12. The transparent electrodes 24, 29 are made of light transmissive conductive material. The light blocking lines 25, 31 are arranged in the display non-overlapping area NOAA of the functional panel 12 and made of light shielding metal material. The light blocking lines 25, 31 partially have the light transmission cutout 35, 36 that are configured to allow the light to pass therethrough.

In this configuration, the liquid crystal panel 11 and the functional panel 12 are bonded together by applying light to cure the photo curable adhesive GL that is arranged between the panels 11, 12. In the display overlapping area OAA of the functional panel 12, which overlaps with the display area AA of the liquid crystal panel 11 in a plan view, the transparent electrodes 24, 29 that are made of the light transmissive conductive material are arranged. In contrast, in the display non-overlapping area NOAA of the functional panel 12, which overlaps with the non-display area NAA of the liquid crystal panel 11 in a plan view, the light blocking lines 25, 31 that are made of light shielding metal material are arranged. Although the sufficient amount of light to cure the photo curable adhesive GL is applied to the photo curable adhesive GL in the display overlapping area OAA of the functional panel 12, the amount of light to be applied to the photo curable adhesive GL in the display non-overlapping area NOAA may be in insufficient.

In the present embodiment, the light blocking lines 25, 31 have the light transmission cutouts 35, 36 that are formed by partially cutting off the lines. The light transmission cutouts 35, 36 allow light to pass therethrough, and thus the amount of light to be applied to the photo curable adhesive GL increases by the areas corresponding to the light transmission cutouts 35, 36. Accordingly, the photo curable adhesive GL is sufficiently cured in the display non-overlapping area NOAA of the functional panel 12, and thus advantages are obtained. For example, the attachment of the liquid crystal panel 11 and the functional panel 12 is maintained with the sufficient holding power.

The light blocking lines 25, 31 include potential supply lines 26, 32 connected to the transparent electrodes 24, 29 to supply potential to the transparent electrodes 24, 29. The potential supply lines 26, 32 included in the light blocking lines 25, 31 are made of light shielding metal material that has a low line resistance and high uniformity compared to the light transmissive conductive material that is the material of the transparent electrodes 24, 29. Accordingly, potential is stably supplied to the transparent electrodes 24, 29 by the potential supply lines 26, 32 compared to a potential supply line that is made of light transmissive conductive material.

At least one of the transparent electrodes 24, 29 in the display overlapping area OAA and the potential supply lines 26, 32 in the display non-overlapping area ONAA includes the extension connectors 24c, 29c that extend toward the other area OAA, ONAA in which the other one of the transparent electrodes 24, 29 and the potential supply lines 26, 32 are arranged. The extension connections 24c, 29c are connected to the other one of the transparent electrodes 24, 29. With this configuration, the extension connectors 24c, 29c that extend to the other area OAA, ONAA side can connect the transparent electrodes 24, 29 in the display overlapping area OAA and the potential supply lines 26, 32 in the display non-overlapping area ONAA.

The transparent electrodes 24, 29 include the extension connectors 24c, 29c. The extension connectors 24c, 29c extend to the display non-overlapping area ONAA and are connected to the potential supply line 26, 32 in the display non-overlapping area ONAA. With this configuration, the quality of the image displayed in the display area AA is enhanced compared to a case in which an extension connection is arranged at the potential supply line and, as a result, a light blocking member is located in the display overlapping area OAA of the functional panel 12.

The liquid crystal display device 10 includes the flexible substrates 28, 34 connected to the functional panel 12 and configured to be connected to an external circuit. The potential supply lines 26, 32 include terminals 26a, 27a, 32a, 33a connected to the flexible substrates 28, 34. The terminals 26a, 27a, 32a, 33a are provided at an end of the potential supply line 26, 32 remote from an end thereof to which the transparent electrodes 24, 29 are connected. Accordingly, the potential supplied from the external circuit is applied to the transparent electrode 24, 29 through the flexible substrate 28, 34 and the potential supply lines 26, 32.

The light blocking lines 25, 31 include the ground lines 27, 33 that are grounded and extend in a substantially loop-like shape that surrounds the display overlapping area OAA and the potential supply lines 26, 32. With this configuration, the transparent electrodes 24, 29 in the display overlapping area OAA and the potential supply lines 26, 32, which are configured to supply potential to the transparent electrodes 24, 29, can be shielded by the grounded ground lines 27, 33 that surround the potential supply lines 26, 32 in addition to the display overlapping area OAA. Accordingly, the potential can be stably supplied to the transparent electrodes 24, 29.

The light blocking lines 25, 31 include the ground line for barrier (first light blocking line) 27 and the ground line for touch panel (second light blocking line) 33 that are arranged on different surfaces of the functional panel 12 from each other. At least a part of the ground line for barrier 27 and at least a part of the ground line for touch panel 33 overlap with each other. The light transmission cutouts 35, 36 include the light transmission cutouts (first light transmission cutouts) 35 provided in the ground line for barrier 27 and the light transmission cutouts (second light transmission cutouts) 36 provided in the ground line for touch panel 33. The light transmission cutouts 35 and the light transmission cutouts 36 overlap with each other in a plan view. With this configuration, at least a part of the ground line for barrier 27 and at least a part of the ground line for touch panel 33 overlap with each other. Compared to a case in which the ground line for barrier and the ground line for touch panel do not overlap, the region that blocks light decreases by an area corresponding to the overlapped portion. Thus the amount of light to be applied to the photo curable adhesive GL increases. Consequently, the light can be sufficiently applied to the photo curable adhesive GL through the light transmission cutouts 35 and 36 that overlap with each other in a plan view.

The functional panel 12 is a parallax barrier panel that can separate the image displayed on the liquid crystal panel 11 by parallax. With this configuration, the image displayed on the liquid crystal panel 11 is separated by the parallax barrier panel, and thus the user of the display device can recognize the stereoscopic image.

The parallax barrier panel includes two substrates 12a and 12b that are arranged to face each other and the liquid crystals sealed between the substrates 12a and 12b. On the plate surface of each of the substrates 12a and 12b on the liquid crystal side, the transparent electrodes 24A to 24D are arranged to face each other. The voltages between the corresponding transparent electrodes 24A to 24D are controlled to provide the barrier sections BA that block light and the barrier openings BO that are located between the barrier sections BA and allow light to pass therethrough. In this configuration in which the barrier sections BA and the barrier opening BO are provided, the image displayed on the liquid crystal panel 11 is seen at a specific viewing angle through the barrier openings BO arranged between the barrier sections BA. This enables the image displayed on the liquid crystal panel 11 to be separated by parallax. In addition, the voltages between the corresponding transparent electrodes 24A to 24D are controlled to selectively form the barrier sections BA and the barrier openings BO of the parallax barrier panel. This enables the switching between the stereoscopic image display and the flat image display.

The transparent electrodes 29 are arranged on another plate surface of one of the substrates 12a, 12b. The other plate surface faces a side opposite to the liquid crystals. The transparent electrodes 29 arranged on the other plate surface provide the touch panel pattern that is configured to detect a position input by the user of the liquid crystal display device 10. Accordingly, the parallax barrier panel can have the touch panel function.

The functional panel 12 is a touch panel in which the transparent electrode 29 configures the touch panel pattern that is configured to detect a position input by the user of the liquid crystal display device 10. Accordingly, the position input by the user is detected by the touch panel pattern constituted by the transparent electrode 29.

The light transmission cutouts 35, 36 are arranged in the longitudinal direction and the width direction of the light blocking lines 25, 31. Accordingly, the light blocking lines 25, 31 are in a net-like shape in a plan view. Thus, breaking is less likely to occur.

The light transmission cutouts 35, 36 each have the equal size and are arranged at a constant arrangement pitch. Accordingly, light passed through the light transmission cutouts 35, 36 is further evenly applied to the photo curable adhesive GL.

The display panel is the liquid crystal panel 11 including two substrates and liquid crystals sealed between the substrates. The display panel includes the backlight unit (lighting device) 13 configured to apply light to the liquid crystal panel 11. With this configuration, the liquid crystal panel 11 can display an image by the light emitted from the backlight unit 13. The liquid crystal display device 10 is applicable to various electronic devices such as a handheld terminal, a mobile phone, a laptop computer, and a handheld gaming device.

Second Embodiment

The second embodiment of the present invention will be described with reference to FIG. 24. In the second embodiment, light transmission cutouts 135, 136 each have a shape different from that in the first embodiment. The construction, operations and effects same as those in the first embodiment will not be explained.

Figure 24:
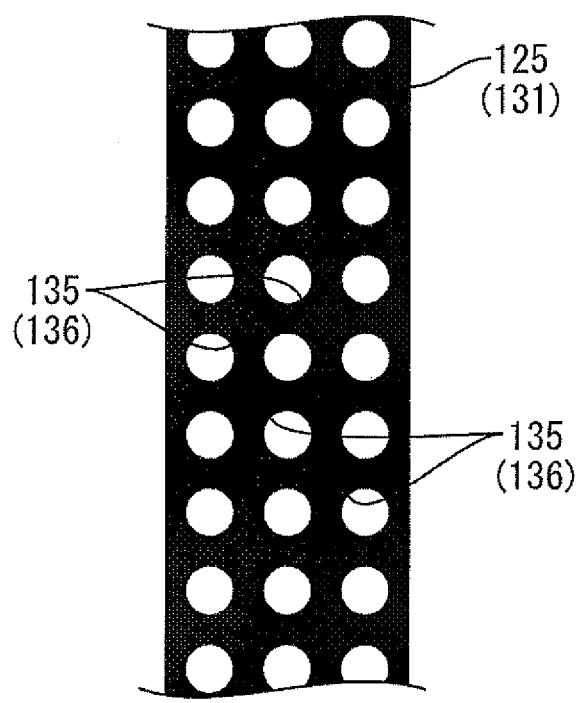
FIG. 24 is a plan view illustrating a plan arrangement of light transmission cutouts in light blocking lines of a second embodiment of the present invention.

As illustrated in FIG. 24, light blocking lines 125, 131 according to this embodiment each have the light transmission cutouts 135, 136 each having a round (circular) shape in a plan view. The light transmission cutouts 135, 136 are positioned in the light blocking lines 125, 131 at substantially regular intervals in the longitudinal direction and the width direction.

Third Embodiment

The third embodiment according to the present invention will be described with reference to FIG. 25. In the third embodiment, light transmission cutouts 235, 236 each have a shape different from that in the first embodiment. The construction, operations and effects same as those in the first embodiment will not be explained.

Figure 25:
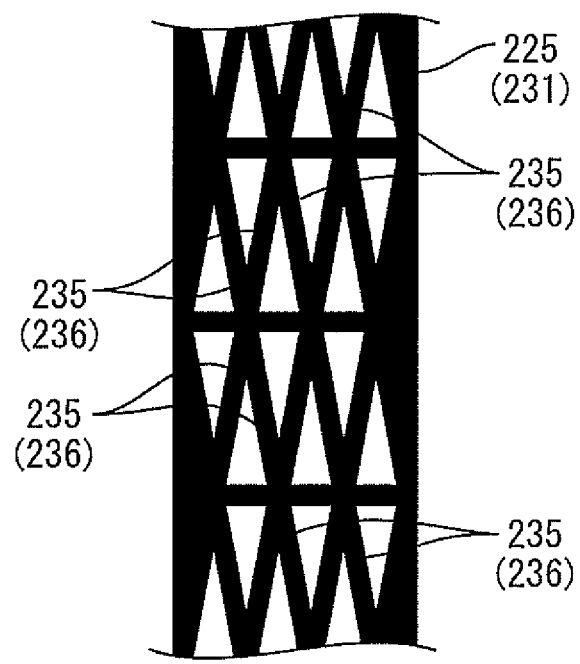
FIG. 25 is a plan view illustrating a plan arrangement of light transmission cutouts in a light blocking line of a third embodiment of the present invention.

As illustrated in FIG. 25, light blocking lines 225, 231 in this embodiment each have the light transmission cutouts 235, 236 each having an elongated triangular shape in a plan view. The light transmission cutouts 235, 236 are arranged such that each light transmission cutout 235, 236 is provided in pair with a base thereof positioned next to each other. The pairs of the light transmission cutouts 235, 236 are positioned at regular intervals in the width direction of the light blocking line 225, 231 and are positioned in the longitudinal direction of the light blocking line 225, 231. The pairs of the light transmission cutouts 235, 236 in the longitudinal direction are not aligned with the adjacent pairs of the light transmission cutouts 235, 236 in the width direction such that only a part of each of the adjacent pairs of the light transmission cutouts 235, 236 in the width direction is adjacent to each other.

Fourth Embodiment

The fourth embodiment according to the present invention will be described with reference to FIG. 26 or FIG. 27. In the fourth embodiment, light transmission cutouts 335, 336 each have a shape different from that in the first embodiment. The construction, operations and effects same as those in the first embodiment will not be explained.

Figure 26:
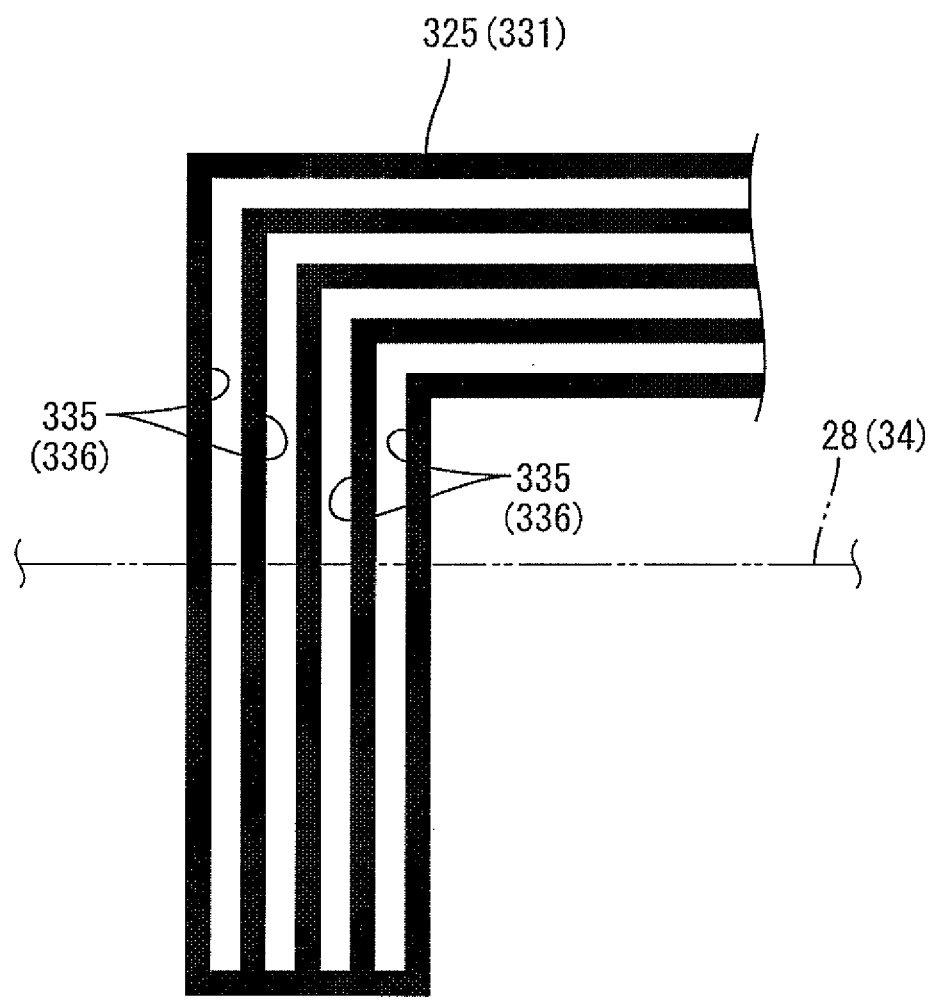
FIG. 26 is a plan view illustrating a plan arrangement of light transmission cutouts around one end in a light blocking line of a fourth embodiment of the present invention.
Figure 27:
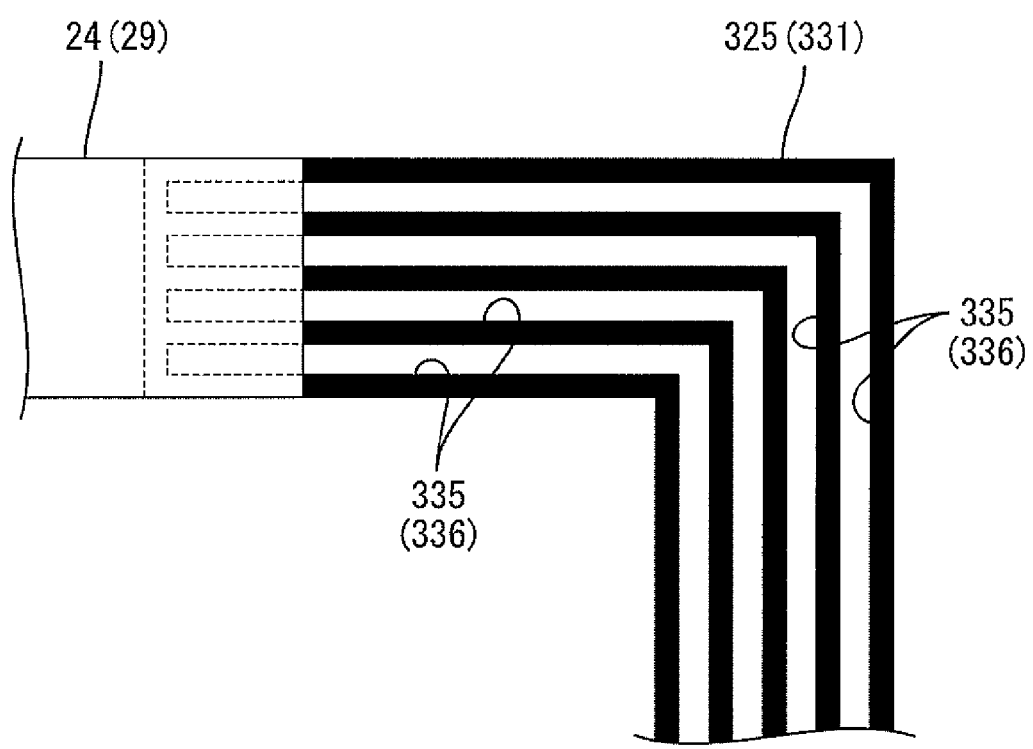
FIG. 27 is a plan view illustrating a plan arrangement of the light transmission cutouts around the other end in the light blocking line.

As illustrated in FIG. 26 and FIG. 27, light blocking lines 325, 331 in this embodiment each have the light transmission cutouts 335, 336 that extend along the long-side direction of the light blocking lines 325, 331. The cutouts 335, 336 each have a slit-like shape extending along a route of each light blocking line 325, 331. The cutouts 335, 336 are positioned over substantially the entire length of the light blocking lines 325, 331 in the longitudinal direction except the ends of the light blocking lines 325, 331. The cutouts 225, 336 are arranged in the width direction at substantially regular intervals in the light blocking lines 325, 331. That is, the light blocking lines 325, 331 each have a stripe-like shape in a plan view. The light transmission cutouts 335, 336 are not positioned at the ends of each light blocking line 325, 331 (a portion connected with the light transmission electrodes 24, 29, and a portion connected with the flexible substrate 28, 34), and thus the stripe-shaped portions of the light blocking line 325, 331 remains connected to one another.

As described above, according to this embodiment, the light transmission cutouts 335, 336 extend parallel to one another in the longitudinal direction of each light blocking line 325, 331. With this configuration, each light blocking line 325, 331 that has a stripe-like shape in a plan view can have the light transmission cutouts 335, 336 that have large areas compared to the light blocking lines 35, 36 of the first embodiment that have a net-like shape. Accordingly, the amount of light to be applied to the photo curable adhesive GL increases.

Fifth Embodiment

Figure 28:
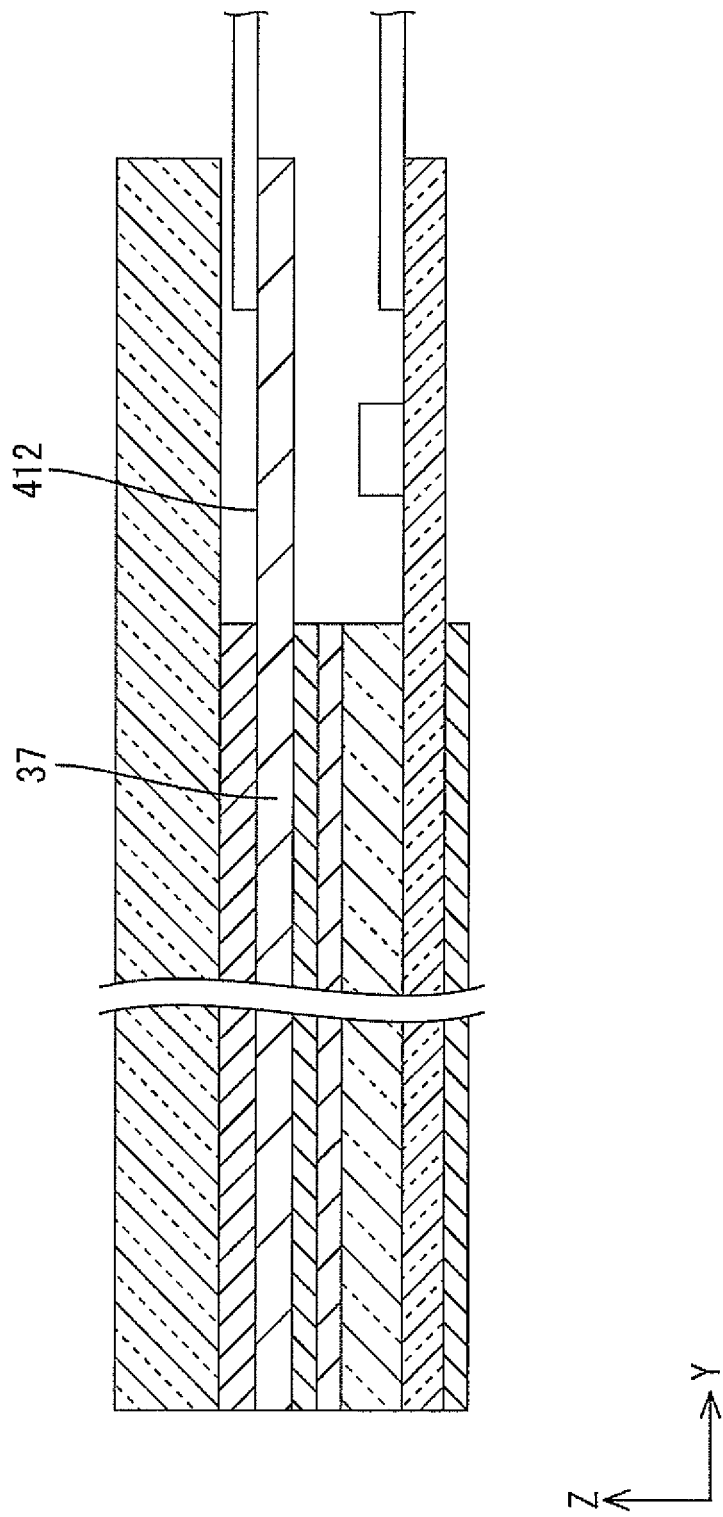
FIG. 28 is a cross sectional view of a liquid crystal panel, a functional panel, and a cover panel according to a fifth embodiment of the present invention.

The fifth embodiment according to the present invention will be described with reference to FIG. 28. In the fifth embodiment, a functional paned 412 is different from that in the first embodiment. The construction, operations and effects same as those in the first embodiment will not be explained.

The functional panel 12 included in the first embodiment is a multifunctional panel that has "parallax barrier function" and "touch panel function". As illustrated in FIG. 28, the functional panel 412 in this embodiment does not have "parallax barrier function" and only has "touch panel function". The functional panel 412 includes a single glass substrate 37 on which the same touch panel pattern as described in the first embodiment is arranged. The functional panel 412 achieves the same operations and effects as those in the first embodiment by forming light transmission cutouts (not illustrated) in a light blocking line (not illustrated) arranged in the substrate 37. The touch panel pattern and the light transmission cutouts are the same as those in the first embodiment and will not be explained.

Other Embodiments

The present invention is not limited to the embodiments explained in the above description with reference to the drawings. The following embodiments may be included in the technical scope of the present invention, for example.

Figure 29:
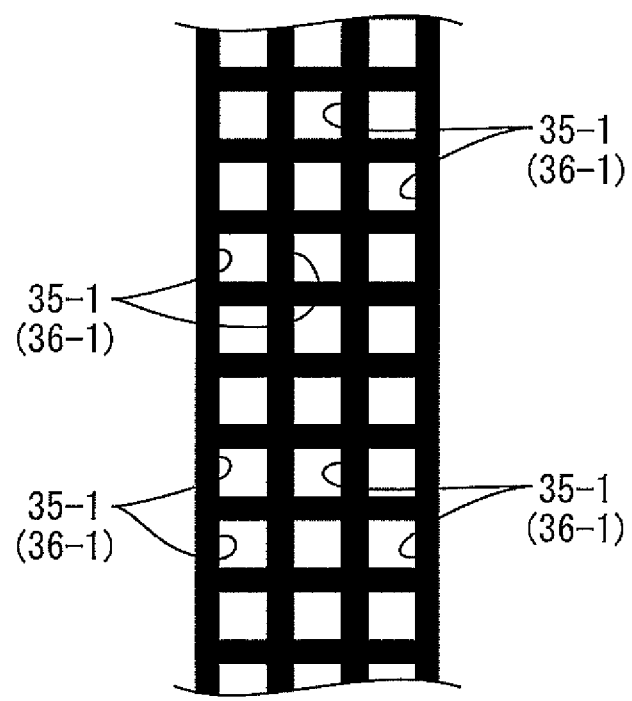
FIG. 29 is a plan view illustrating a plan arrangement of light transmission cutouts in a light blocking line according to the other embodiment (1) of the present invention.

(1) Other than the first to fourth embodiments, the shape of the light transmission cutout may be suitably changed. For example, as illustrated in FIG. 29, light transmission cutouts 35-1 (36-1) each may have a square shape in a plan view.

Figure 30:
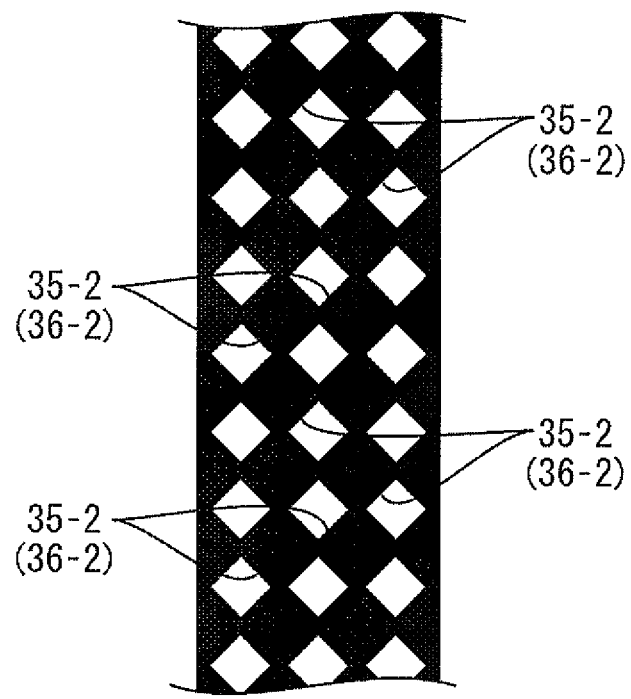
FIG. 30 is a plan view illustrating a plan arrangement of light transmission cutouts in a light blocking line according to the other embodiment (2) of the present invention.

(2) Other than the above (1), as illustrated in FIG. 30, for example, light transmission cutouts 35-2 (36-2) each may have a rhombic shape in a plan view.

Figure 31:
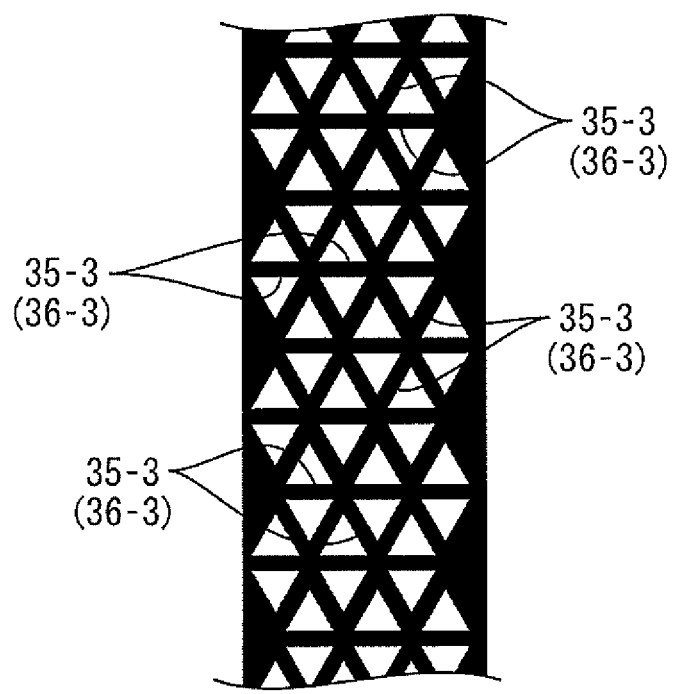
FIG. 31 is a plan view illustrating a plan arrangement of light transmission cutouts in a light blocking line according to the other embodiment (3) of the present invention.

(3) Other than the above (1) and (2), as illustrated in FIG. 31, for example, light transmission cutouts 35-3 (36-3) each may have an equilateral triangle shape in a plan view.

(4) Other than the above (1) to (3), light transmission cutouts each may have a star shape, an elliptical shape, a polygonal shape having at least five sides and five interior angles, or a trapezoidal shape.

(5) In the above embodiments, the light transmission cutouts are positioned at substantially regular intervals. However, in the present invention, the light transmission cutouts may be positioned at irregular intervals.

(6) In the above embodiments, the cutouts are not positioned at the outer peripheral portion of each light blocking line. However, in the present invention, a light transmission cutout that has a concaved shape may be positioned at the outer peripheral portion of each light blocking line by cutting off the outer peripheral portion.

(7) Other than the above embodiments, the number, the size in a plan view, and the arrangement of light transmission cutouts in each light blocking line may be suitably changed.

(8) In the above embodiments, the light transmission cutouts are provided over the entire length and area of each light blocking line. However, the light blocking lines each may include an area with the light transmission cutout and an area without the light transmission cutout. Specifically, the light transmission cutout may be provided in an area of each light blocking line that overlaps with the photo curable adhesive in a plan view (an adhesive overlapping area), and the light transmission cutout may not be provided in an area that does not overlap with the photo curable adhesive in a plan view (an adhesive non-overlapping area). This configuration can achieve the same operations and effects as the above embodiments.

(9) In the above fifth embodiment, the functional panel does not have the parallax barrier function and only has the touch panel function. However, in the present invention, the functional panel may not have the touch panel function and may only have the parallax barrier function. In such a case, the touch panel pattern and the flexible substrate for touch panel, for example, are eliminated from the functional panel of the first embodiment.

(10) In the above embodiments, the functional panel is arranged on the front side relative to the liquid crystal panel. However, the liquid crystal panel may be arranged on the front side relative to the functional panel. In such a case, ultra violet rays may be applied to the photo curable adhesive from the rear side through the functional panel. This configuration is suitable for the above (9).

(11) In the above embodiments, the potential supply lines and the ground lines that are arranged in the display non-overlapping area of the functional panel are made of light shielding metal material. However, either the potential supply lines or the ground lines may be made of light transmissive conductive material same as the transparent electrodes.

(12) In the above embodiments, the ultra violet curable resin material that is cured by the application of ultra violet rays is used as the photo curable adhesive. However, a visible light curable resin material that is cured by the application of visible light may be used as the photo curable adhesive. A radical polymerization type of a photo curable resin material that includes acrylate or unsaturated polyester as a main component may also be used as the photo curable adhesive.

(13) In the above embodiment, each of the pad electrodes constituting the touch panel pattern of the functional panel has a rhombic shape in a plan view. However, the shape in a plan view of each of the pad electrodes may be suitably changed. For example, the pad electrodes each may have a square shape, a rectangular shape, a star shape, a polygonal shape having at least five sides and five interior angles, or a circular shape.

(14) In the above embodiments, the ground line for touch panel is partially disconnected and has an open loop shape with open ends. However, in the present invention, the ground line for touch panel may have a loop shape without having a disconnected portion like the ground line for barrier. In contrast, the ground line for barrier may be partially disconnected and have an open loop shape with open ends like the above described ground line for touch panel. Further, the present invention may include the configuration in which at least one of the ground line for touch panel and the ground line for barrier are not included.

(15) In the above embodiments, ITO is used as the material of the pixel electrode of the liquid crystal panel or the transparent electrode of the functional panel. Other than ITO, a material that does not include indium, which is a rare metal, for example Zinc Oxide (ZnO), may be used.

(16) In the above embodiments, the reference potential is supplied to some of the transparent electrodes for barrier of the functional panel to fulfill the parallax barrier function. However, a different driving method may be used. For example, different potentials, which are different from the reference potential, may be supplied to the different transparent electrodes to fulfill the barrier function.

(17) In the above embodiments, the projected capacitive type is described as the example of the touch panel pattern of the functional panel. The present invention is applicable to a surface capacitive type, a resistive film type, or an electromagnetic induction type touch panel pattern.

(18) In the above embodiments, the liquid crystal display device that can display the stereoscopic image when placed in both of the portrait (vertical) orientation and the landscape (horizontal) orientation is described as an example. However, the liquid crystal display device according to the present technology may have a configuration that can display the stereoscopic image only when placed in one of the portrait orientation and the landscape orientation.

(19) The above embodiments include the functional panel that allows the user to see the stereoscopic image. The present application is applicable to the liquid crystal display device that includes a functional panel having a "multi-view function" that allows users at different viewing angles to see different images.

(20) In the above embodiments, the functional panel is the switching liquid crystal panel, which is an active component that can switch between the flat image display and the stereoscopic image display. However, the active component other than the switching liquid crystal panel may be used as the parallax barrier.

(21) Other than the above (20), as the parallax barrier, inactive pixels that are configured to always display a stereoscopic image display and cannot be switched to the flat image display may be used. For example, a mask filter having a specific light blocking pattern may be used.

(22) In the above embodiments, the backlight unit included in the liquid crystal display device is the edge-light type backlight unit. However, the backlight unit may be a direct-type backlight unit.

(23) In the above embodiments, the liquid crystal display device is a transmission type liquid crystal display device including the backlight unit as an external light source. However, the technology may be applied to a reflection type liquid crystal display device configured to display using light outside the display device. In such a case, the liquid crystal display device may not include the backlight unit.

(24) In the above embodiments, the liquid crystal display device includes a display screen having an elongated rectangular shape. However, the liquid crystal display device may include a display screen having a square shape.

(25) In the above embodiments, the TFTs are used as switching components of the liquid crystal display device. However, the technology described herein may be applied to liquid crystal display devices using switching components other than TFTs (e.g., thin film diodes (TFDs)). Furthermore, the technology may be applied to black-and-white liquid crystal display devices other than a color liquid crystal display device.

(26) The above embodiments employs the liquid crystal display device including the liquid crystal panel as a display panel. However, the technology can be applied to display devices including other types of display panels (such as PDP and an organic EL panel). In such a case, the backlight unit may not be included.

EXPLANATION OF SYMBOLS

10: liquid crystal display device (display device), 11: liquid crystal panel (display panel), 11a: CF substrate (substrate), 11b: array substrate (substrate), 12: functional panel, 12a: first substrate (substrate), 12b: second substrate (substrate), 13: backlight unit (lighting device), 24: transparent electrode for barrier (transparent electrode), 24c: extension connection, 25: light blocking line for barrier (light blocking line, first light blocking line), 26: potential supply line for barrier (potential supply line), 26a: terminal, 27: ground line for barrier (ground line, first light blocking line), 27a: terminal, 28: flexible substrate for barrier (flexible substrate), 29: transparent electrode for touch panel (transparent electrode), 29c: extension connection, 31: light blocking line for touch panel (light blocking line, second light blocking line), 32: potential supply line for touch panel (potential supply line), 32a: terminal, 33: ground line for touch panel (ground line, second light blocking line), 33a: terminal, 34: flexible substrate for touch panel (flexible substrate), 35: light transmission cutout (first light transmission cutout), 36: light transmission cutout (second light transmission cutout), AA: display area, BA: barrier section, BO: barrier opening, GL: photo curable adhesive, NAA: non-display area, OAA: display overlapping area, ONAA: display non-overlapping area

The invention claimed is:

1. A display device comprising:
   a display panel including a display area in which an image is displayed and a non-display area surrounding the display area;
   a functional panel attached to the display panel, the functional panel including a display overlapping area overlapping with the display area in a plan view and a display non-overlapping area overlapping with the non-display area in a plan view, the display non-overlapping area including a portion in which an electrical component is to be connected;
   a photo curable adhesive between the display panel and the functional panel and cured by light applied thereto, the photo curable adhesive extending over an entirety of the display area and over a majority of the non-display area excluding a portion of the non-display area overlapping the portion of the display non-overlapping area in which the electrical component is to be connected;
   a transparent electrode arranged in the display overlapping area of the functional panel and made of light transmissive conductive material; and
   a light blocking line arranged in the display non-overlapping area of the functional panel and made of light shielding metal material, the light blocking line including a plurality of light transmission cutouts that allow the light to pass therethrough, wherein
   the light blocking line includes:
      a first portion overlapping the photo curable adhesive; and
      a second portion not overlapping the photo curable adhesive, wherein each of the first portion and the second portion includes the plurality of light transmission cutouts.

2. The display device according to claim 1, wherein the light blocking line includes a potential supply line connected to the transparent electrode to supply a potential to the transparent electrode.

3. The display device according to claim 2, wherein at least one of the transparent electrode in the display overlapping area and the potential supply line in the display non-overlapping area includes an extension connector, the extension connector extending toward at least one of the display overlapping area and the display non-overlapping area and being connected to the other one of the transparent electrode and the potential supply line.

4. The display device according to claim 3, wherein the transparent electrode includes the extension connector, the extension connector extending to the display non-overlapping area and being connected to the potential supply line.

5. The display device according to claim 2, further comprising a flexible substrate connected to the functional panel and an external circuit, wherein
the potential supply line includes a terminal connected to the flexible substrate, the terminal being provided at an end of the potential supply line remote from an end thereof to which the transparent electrode is connected.

6. The display device according to claim 2, wherein:
the light blocking line further includes a ground line that is grounded; and
the ground line extends in a loop-like shape that surrounds the display overlapping area and the potential supply line.

7. The display device according to claim 1, wherein:
the light blocking line includes a first light blocking line and a second light blocking line that are arranged on different surfaces of the functional panel from each other, at least a part of the first light blocking line and at least a part of the second light blocking line overlapping with each other in a plan view;
the light transmission cutout includes a first light transmission cutout in the first light blocking line and a second light transmission cutout in the second light blocking line; and
the first light transmission cutout and the second light transmission cutout overlap with each other in a plan view.

8. The display device according to claim 1, wherein the functional panel is a parallax barrier panel that separates the image displayed on the display panel by parallax.

9. The display device according to claim 8, wherein:
the parallax barrier panel includes two substrates arranged to face each other and liquid crystals sealed between the substrates;
the transparent electrode includes a plurality of transparent electrodes; and
each of the transparent electrodes is arranged on a plate surface of each of the substrates so as to face each other with the liquid crystals therebetween, the transparent electrodes provide a plurality of barrier sections and a barrier opening between the barrier sections by a controlled voltage between the transparent electrodes, the barrier sections block light, the barrier opening allows light to pass therethrough.

10. The display device according to claim 9, wherein one of the transparent electrodes is arranged on another plate surface of one of the substrates, the other plate surface facing a side opposite to the liquid crystals, and
the transparent electrode arranged on the other plate surface provides a touch panel pattern that detects a position input by a user of the display device.

11. The display device according to claim 1, wherein the functional panel is a touch panel in which the transparent electrode configures a touch panel pattern that detects a position input by a user of the display device.

12. The display device according to claim 1, wherein the light transmission cutouts are arranged in a longitudinal direction and a width direction of the light blocking line.

13. The display device according to claim 12, wherein the plurality of light transmission cutouts each have an equal size and are arranged at a constant arrangement pitch.

14. The display device according to claim 1, wherein the light transmission cutout extends along a longitudinal direction of the light blocking line.

15. The display device according to claim 1, wherein:
the display panel is a liquid crystal panel that includes two substrates and liquid crystals sealed between the substrates; and
the display device further includes a lighting device that applies light to the liquid crystal panel.

16. The display device according to claim 1, wherein the photo curable adhesive is a liquid-based adhesive cured by light.

17. A display device comprising:
a display panel including a display area in which an image is displayed and a non-display area surrounding the display area;
a functional panel attached to the display panel, the functional panel including a display overlapping area overlapping with the display area in a plan view and a display non-overlapping area overlapping with the non-display area in a plan view, the display non-overlapping area including a portion in which an electrical component is to be connected;
a photo curable adhesive between the display panel and the functional panel and cured by light applied thereto, the photo curable adhesive extending over an entirety of the display area and over a majority of the non-display area excluding a portion of the non-display area overlapping the portion of the display non-overlapping area in which the electrical component is to be connected;
a transparent electrode arranged in the display overlapping area of the functional panel and made of light transmissive conductive material; and
a light blocking line arranged in the display non-overlapping area of the functional panel and made of light shielding metal material, the light blocking line including a plurality of light transmission cutouts that allow the light to pass therethrough, wherein
the plurality of light transmission cutouts are arranged over an entire area of the light blocking line with a constant arrangement pitch.

* * * * *